(12) United States Patent
Tamura et al.

(10) Patent No.: US 9,905,268 B2
(45) Date of Patent: Feb. 27, 2018

(54) DRAWING PROCESSING DEVICE AND METHOD

(71) Applicant: FUJITSU LIMITED, Kawasaki-shi, Kanagawa (JP)

(72) Inventors: Hiroki Tamura, Onojo (JP); Kazumi Doi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/440,066

(22) Filed: Feb. 23, 2017

(65) Prior Publication Data

US 2017/0278549 A1 Sep. 28, 2017

(30) Foreign Application Priority Data

Mar. 24, 2016 (JP) ................................. 2016-060155

(51) Int. Cl.
```
H04N 5/93        (2006.01)
G11B 27/036      (2006.01)
G11B 27/34       (2006.01)
H04N 21/426      (2011.01)
H04N 21/81       (2011.01)
H04N 21/435      (2011.01)
```

(52) U.S. Cl.
CPC ............ *G11B 27/036* (2013.01); *G11B 27/34* (2013.01); *H04N 21/42653* (2013.01); *H04N 21/435* (2013.01); *H04N 21/8153* (2013.01)

(58) Field of Classification Search
CPC .... G11B 27/036; G11B 27/34; H04N 21/435; H04N 21/8153; H04N 21/42653
USPC ................ 386/278, 281, 280, 286, 343, 353
See application file for complete search history.

(56) References Cited

U.S. PATENT DOCUMENTS

| | | | |
|---|---|---|---|
| 7,505,050 B2 | 3/2009 | McCrossan et al. | |
| 7,664,370 B2 | 2/2010 | McCrossan et al. | |
| 2006/0242676 A1 | 10/2006 | Hoshino | |
| 2015/0177940 A1* | 6/2015 | Trevino | H04L 67/08 715/716 |
| 2016/0286128 A1* | 9/2016 | Zhou | H04N 5/23248 |

FOREIGN PATENT DOCUMENTS

| | | |
|---|---|---|
| JP | 2005-51703 A | 2/2005 |
| JP | 2005-79913 A | 3/2005 |
| JP | 2006-146481 A | 6/2006 |

(Continued)

*Primary Examiner* — Robert Chevalier
(74) *Attorney, Agent, or Firm* — Westerman, Hattori, Daniels & Adrian, LLP

(57) ABSTRACT

A drawing processing device includes a processor that executes a process. The process includes: receiving, for any frame out of a plurality of frames included in a video that have each been associated with drawing information representing drawing performed on the plurality of frames, position information indicating a position within the frame of an edited drawing, and editing content; referencing a storage section storing associated information of the position information of the drawing within the frame and an identifier of the frame on which the drawing was performed, and ascertaining identifiers of any frames corresponding to the received position information; and, based on the received editing content, editing the drawing information associated with each frame indicated by the ascertained identifiers.

19 Claims, 20 Drawing Sheets

(56) References Cited

FOREIGN PATENT DOCUMENTS

| | | |
|---|---|---|
| JP | 2006-148425 A | 6/2006 |
| JP | 2006-197485 A | 7/2006 |
| WO | 2004/098193 A2 | 11/2004 |
| WO | 2005/002220 A1 | 1/2005 |

* cited by examiner

FIG.4

| TIME (ms) | X COORDINATE | Y COORDINATE | SIZE | COLOR | OPERATION | ID | START POINT FLAG | END POINT FLAG |
|---|---|---|---|---|---|---|---|---|
| 1 | 150 | 280 | 3 | 15 | ADDITION | 1 | | |
| 2 | 150 | 280 | 3 | 15 | ADDITION | 1 | | |
| ... | | | | | | | | |

| X COORDINATE | Y COORDINATE | FRAME NUMBER | | | | |
|---|---|---|---|---|---|---|
| | | DRAWING HISTORY 1 | DRAWING HISTORY 2 | DRAWING HISTORY 3 | DRAWING HISTORY 4 | DRAWING HISTORY 5 |
| 0 | 0 | 0 | 0 | 0 | 0 | 0 |
| 0 | 1 | 0 | 0 | 0 | 0 | 0 |
| 0 | 2 | 0 | 0 | 0 | 0 | 0 |
| 0 | 3 | 0 | 0 | 0 | 0 | 0 |
| ~ | | | | | | |
| 151 | 277 | 2 | 50 | 0 | 0 | 0 |
| 151 | 278 | 2 | 50 | 0 | 0 | 0 |
| ~ | | | | | | |
| 159 | 270 | 2 | 0 | 0 | 0 | 0 |
| 159 | 271 | 2 | 0 | 0 | 0 | 0 |
| 159 | 272 | 0 | 0 | 0 | 0 | 0 |
| ~ | | | | | | |
| 640 | 480 | 0 | 0 | 0 | 0 | 0 |

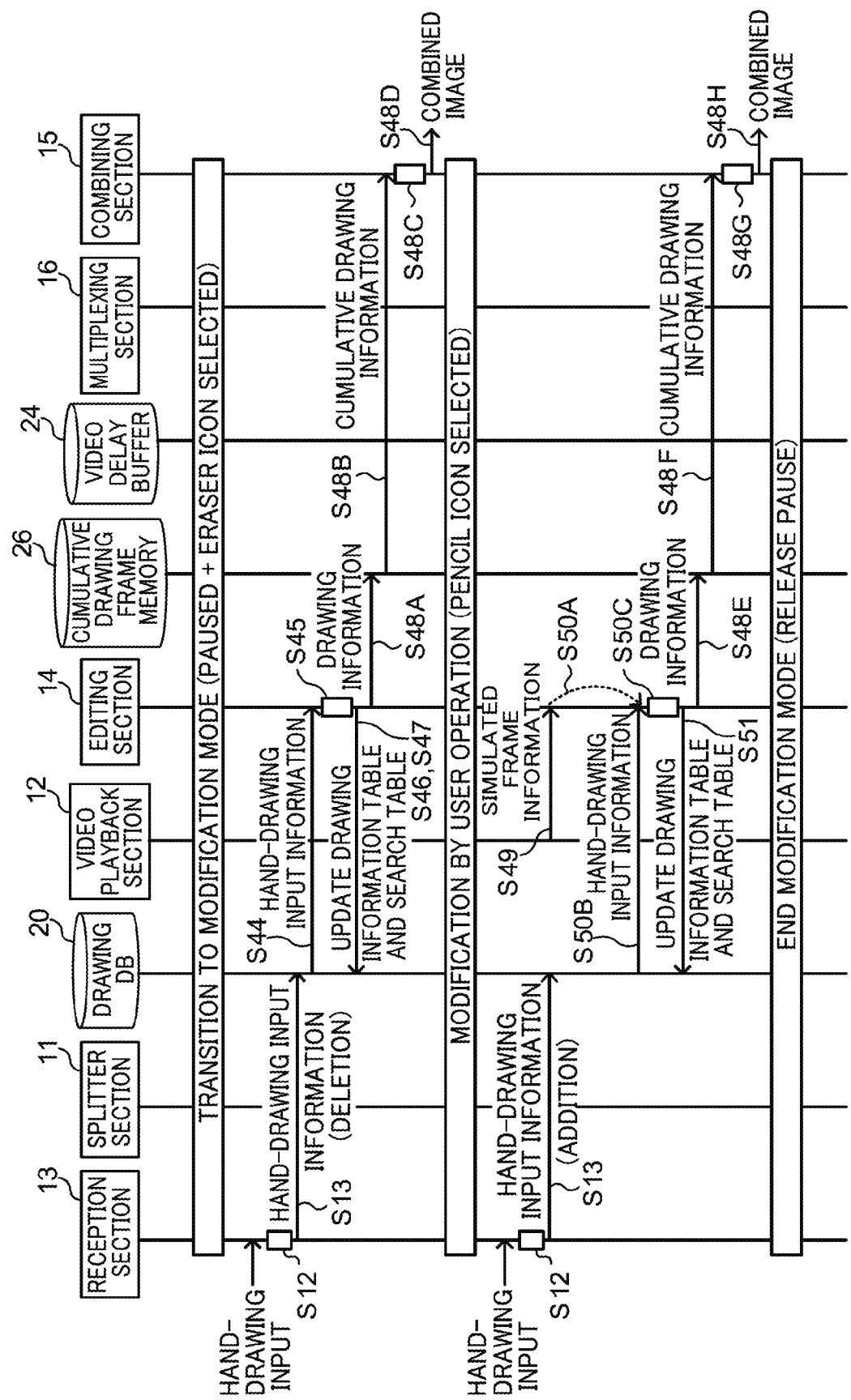

DRAWING PROCESSING DEVICE AND METHOD

CROSS-REFERENCE TO RELATED APPLICATION

This application is based upon and claims the benefit of priority of the prior Japanese Patent Application No. 2016-060155, filed on Mar. 24, 2016, the entire contents of which are incorporated herein by reference.

FIELD

The embodiments discussed herein are related to a drawing processing device, a drawing processing method, and a recording medium storing a drawing processing program.

BACKGROUND

Overlaid display of, for example, hand-drawn drawings on video images during video image playback has been performed hitherto. For example, a live streaming broadcast method for broadcasting live over a network has been proposed. In this live streaming broadcast method, at the same time as camera footage data is being input, other footage data such as hand-drawn drawing data is combined with the camera footage data that is being input.

Moreover, a system has been proposed in which a lecturer computer displays necessary lecture materials, and also displays captured images of a lecturer captured using a camera combined with hand-drawn image data from a tablet.

A system for playback of a digital stream stored on a recording medium has also been proposed. The digital stream is obtained by multiplexing a video stream and a graphics stream of subtitles or the like.

Technology has also been proposed for managing image data associated with footage captured using an imaging device, and vector data obtained by performing moving object extraction processing on the footage. In this technology, vector data expressing a graphic representing a position and size of a moving object obtained corresponding to image data is connected to the end of the image data of each frame, and transmitted to a video display device. Every time image data of an individual frame is received from a video data management device, the video display device performs display processing based on the image data of that frame. Then, line drawings expressing the graphic generated based on the vector data are added on top of an image reproduced based on the image data.

RELATED PATENT DOCUMENTS

Japanese Laid-Open Patent Publication No. 2005-51703
Japanese Laid-Open Patent Publication No. 2005-79913
International Publication No. 2005/002220
Japanese Laid-Open Patent Publication No. 2006-197485

SUMMARY

According to an aspect of the embodiments, a drawing processing device includes: a memory; and a processor coupled to the memory, the processor configured to: receive, for any frame out of a plurality of frames included in a video that have each been associated with drawing information representing drawing performed on the plurality of frames, position information indicating a position within the frame of an edited drawing, and editing content; reference the memory storing associated information of the position information of the drawing within the frame and an identifier of the frame on which the drawing was performed, and ascertain identifiers of any frames corresponding to the received position information; and, based on the received editing content, edit the drawing information associated with each frame indicated by the ascertained identifiers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a hand-drawn information table;

FIG. 7 is a diagram illustrating an example of a search table;

FIG. 21 is a sequence diagram to explain processing of a drawing processing device.

DESCRIPTION OF EMBODIMENTS

Detailed explanation follows regarding an example of an exemplary embodiment of technology disclosed herein, with reference to the drawings.

Figure 1:
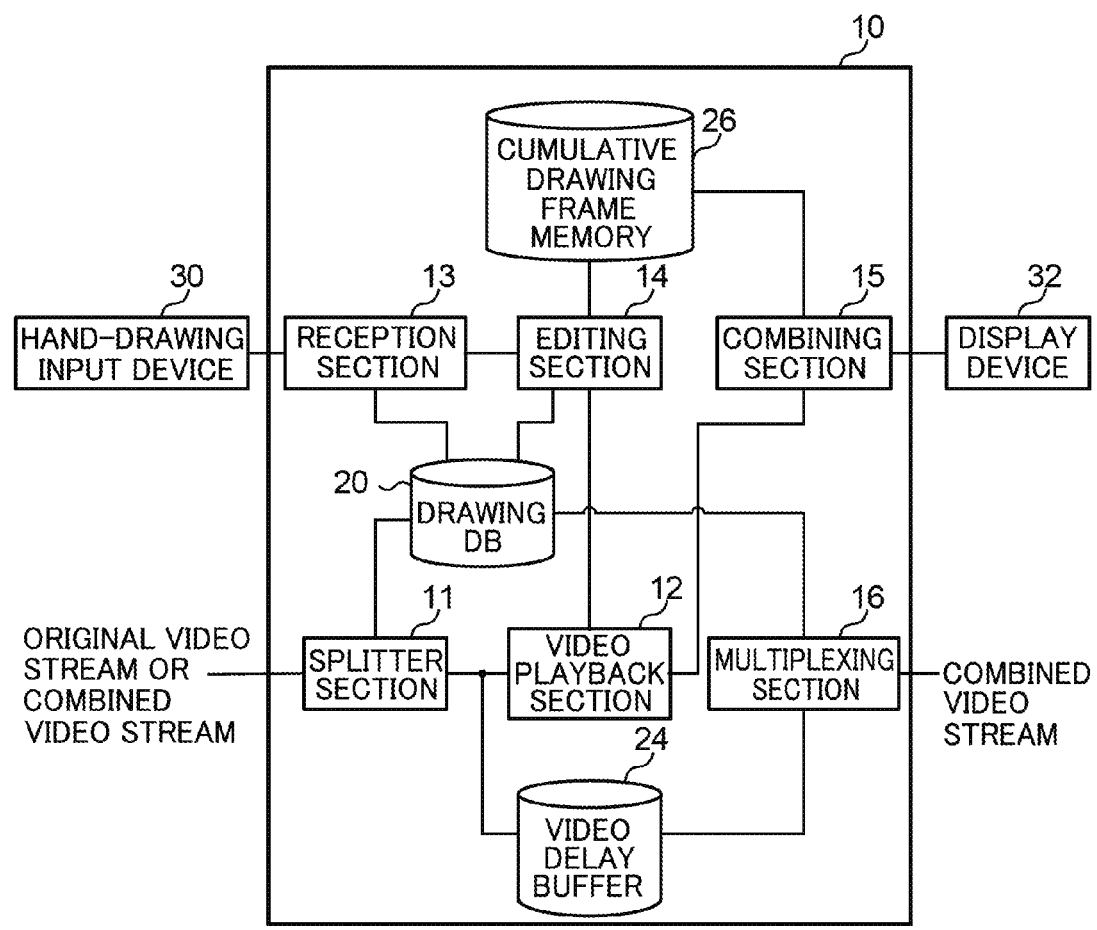
FIG. 1 is a functional block diagram illustrating a schematic configuration of a drawing processing device according to an exemplary embodiment.

As illustrated in FIG. 1, a drawing processing device 10 according to the present exemplary embodiment uses a display device 32 to play back an input original video stream or combined video stream, and receives drawings that have been hand-drawn using a hand-drawing input device 30 on the video that is being played back by the display device 32. An original video stream is video data configured by plural frames. A combined video stream is data in which drawing information representing hand-drawn drawings has been multiplexed with the original video stream. The following explanation refers simply to a "video stream" when no distinction is made between the original video stream and the combined video stream. The drawing processing device 10 displays the received hand-drawn drawings overlaid on the video that is played back by the display device 32, and generates and saves a combined video stream in which the drawing information representing the hand-drawn drawings is multiplexed with the original video stream.

The original video stream may be multiplexed with other data, such as audio data. General multiplexing and splitting technology may be used for such audio data and the like in a splitter section 11 and a multiplexing section 16, described later, and so explanation thereof is omitted in the present exemplary embodiment.

The display device 32 may, for example, be configured by a touch panel display in which a liquid crystal display and a touch panel are integrated together. The hand-drawing input device 30 is a pointing device employed to perform various operations such as selecting buttons and keys displayed on the liquid crystal display, and to hand-draw text and graphics, through touch operation of the touch panel.

Figure 2:
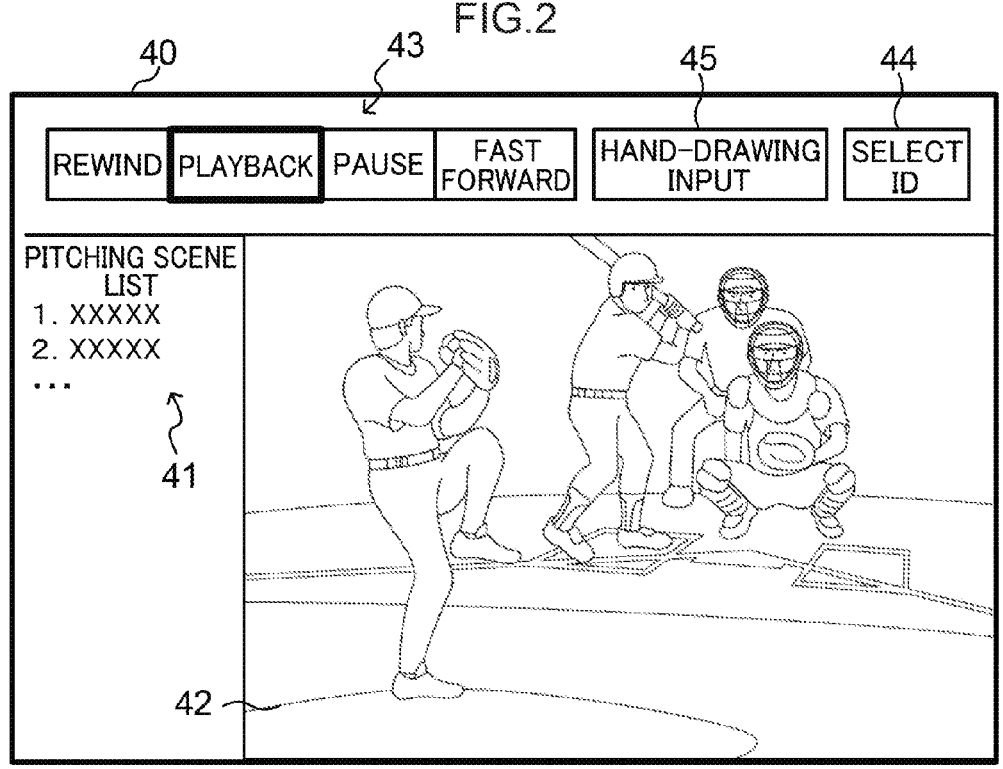
FIG. 2 is a diagram illustrating an example of a screen.

Explanation follows regarding the outline of the present exemplary embodiment, with reference to an example of a screen 40 displayed on the display device 32, as illustrated in FIG. 2. FIG. 2 illustrates a screen 40 displayed in an anticipated scenario in which a baseball coach, as an instructor, instructs players, as instructees, on pitching form, batting form, or the like. In this example, it is anticipated that an original video stream showing a recording of a past game is played back on the display device 32, and the instructor instructs the instructees while drawing with the hand-drawing input device 30.

In the example in FIG. 2, the screen 40 includes a list display region 41 that displays a list of video streams that can be played back, and a playback region 42 on which video representing a video stream selected from the list display region 41 is played back. The screen 40 also includes a command button panel 43 for instructing control such as rewind, playback, pause, fast-forward, and the like of the video that is being played back in the playback region 42, and an ID selection button 44 for selecting an ID (identification, described in detail later), this being identification information of the drawing information. The screen 40 also includes a hand-drawing input button 45 that is selected in order to draw by hand using the hand-drawing input device 30.

Note that it is conceivable that video with an overlaid display of input hand-drawn drawings may be recorded in order to enable subsequent review by the instructor or instructees. In such cases, sometimes it is desirable to modify hand-drawn portions in order to prevent records of incorrect explanations from remaining when written errors were made during the initial hand-drawing.

However, if video with an overlaid display of drawings is saved as a single file, as in the related technology, once input, it is not possible to modify hand-drawn drawings in part. Therefore, files with an overlaid display of erroneous drawings are not saved, and video playback and hand-drawing input has to be started over from the beginning.

Technology such as the related technology in which video image analysis is used to generate data that is overlaid on a video, with this data being modifiable, could conceivably be applied in order to modify hand-drawn information. In such cases, video image analysis is used to obtain the data overlaid on the video, and so it is determined in advance which frames of the video will be overlaid. However, with hand-drawn drawings, it is not possible to know what positions on which frames will be drawn on, even if video image analysis is used. Therefore, the individual frames on which the data to be modified is overlaid are displayed, and the overlaid data is modified on each individual frame.

Accordingly, in related techniques, or techniques in which related techniques are applied to hand-drawn drawings, it is not possible to partially modify input hand-drawn drawings. Moreover, there is an issue that modification demands laborious work.

The present exemplary embodiment provides a method for partially editing input hand-drawn drawing information (deleting and adding drawings) by a simple operation.

Figure 3:
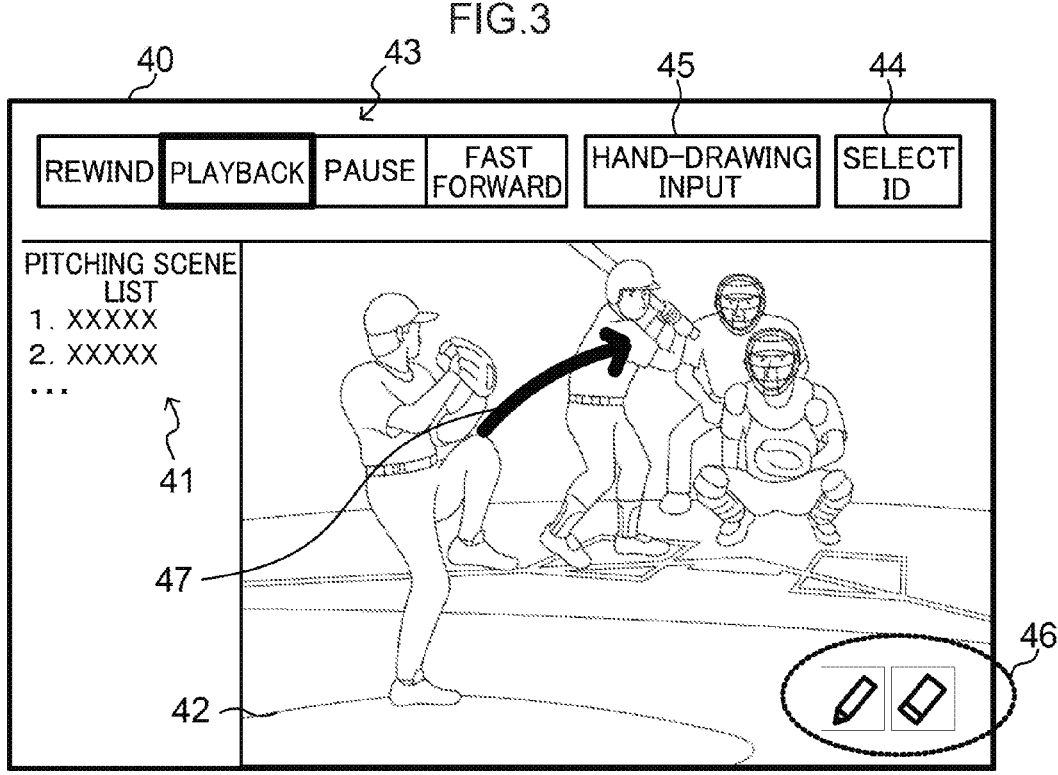
FIG. 3 is a diagram illustrating an example of a screen displaying hand-drawing tools.

In the present exemplary embodiment, as illustrated in FIG. 3, when the hand-drawing input button 45 on the screen 40 is selected, hand-drawing tools 46, including a pencil icon and an eraser icon, are displayed on the screen 40. The pencil icon is an icon used to select a pencil tool, and a hand-drawn drawing (labeled 47 in FIG. 3) can be added on the screen 40 by operating the pencil tool using the hand-drawing input device 30. The pencil tool allows selection of the size (thickness) and color of the drawn line. The eraser icon is an icon used to select an eraser tool, and a previously hand-drawn drawing can be deleted by operating the eraser tool using the hand-drawing input device 30.

The present exemplary embodiment provides a method for partially modifying drawing information, without the effort of searching for and displaying the relevant frames by rewinding the video or the like, when modifying drawings using the hand-drawing tools mentioned above. Moreover, the present exemplary embodiment provides a method that enables partial modification even of drawing information that has been multiplexed and saved as a combined video stream.

Explanation follows regarding the respective functional sections of the drawing processing device 10 according to the present exemplary embodiment.

As illustrated in FIG. 1, functionally, the drawing processing device 10 includes the splitter section 11, a video playback section 12, a reception section 13, an editing section 14, a combining section 15, and the multiplexing section 16. A drawing database (DB) 20 is stored in a specific storage region of the drawing processing device 10, and a video delay buffer 24 and a cumulative drawing frame memory 26 are also provided in the specific storage region.

When the splitter section 11 is input with a combined video stream, the combined video stream is split into video data and drawing information. The splitter section 11 passes the split-off video data to the video playback section 12, and the split-off video data is stored in the video delay buffer 24. The video delay buffer 24 is a storage region that stores one file's worth of video data in order to generate the combined video stream. The splitter section 11 stores the split-off drawing information in a hand-drawn information table (described in detail later) of the drawing DB 20. When input with an original video stream, the splitter section 11 passes the video data to the video playback section 12, and stores the video data in the video delay buffer 24, similarly to with the split-off video data described above.

The video playback section 12 decodes the video data passed from the splitter section 11, and outputs image data (referred to below as "frame images") for each frame to the combining section 15 one frame at a time, at a specific frame rate (for example, 30 fps). The video playback section 12 also outputs frame information to the editing section 14 at the timing at which the frame images are output to the combining section 15 one frame at a time. The frame information includes identifier information for the output frames. The frame identifiers may, for example, employ frame numbers appended in the sequence 1, 2, and so on, starting from the first frame, or a playback duration (referred to below as frame duration) from the start of the first frame until that frame is displayed. In the present exemplary embodiment, explanation is given regarding an example in which frame numbers are employed as the frame identifiers.

The reception section 13 receives selection operations for the respective buttons displayed on the screen 40. Moreover, when the hand-drawing input button 45 has been selected, at a specific timing (for example, every 1 msec), the reception section 13 receives operation content input by the hand-drawing input device 30, and position information expressing a position where hand-drawing has been performed, as operation information from the hand-drawing input device 30. The operation content is "addition" when the pencil tool is selected, and is "deletion" when the eraser tool has been selected. The position information is the coordinate positions of respective pixels in a coordinate system set for the playback region 42. For example, the coordinate system may be a coordinate system with an origin at a specific position in the playback region 42 (for example, the top right corner), with an X+ direction running toward the left, and a Y+ direction running toward the bottom.

The reception section 13 associates the operation content and position information received from the hand-drawing input device 30, information of the selected size and color of the pencil tool, and set ID information with each other, and stores the associated information in the hand-drawn information table of the drawing DB 20 as hand-drawing input information. FIG. 4 illustrates an example of a hand-drawn information table 21. In the example of the hand-drawn information table 21 in FIG. 4, every time the operation content and position information are received from the reception section 13, the hand-drawing input information is associated with the operation content and position, and stored. The hand-drawn information table 21 includes sufficient capacity to store hand-drawing input information acquired during the display duration of at least one frame.

Note that the "ID" in the hand-drawn information table 21 is information to identify a set of hand-drawn drawings. For example, in a state in which the hand-drawing input button 45 has been selected, the ID selection button 44 can be selected to set a desired ID (for example, "1"). The ID set in this manner is employed as the ID of the hand-drawing input information. Moreover, a user ID used when logging into an application provided by the drawing processing device 10 may be employed as the ID of the hand-drawing input information.

A "start point flag" and "end point flag" in the hand-drawn information table 21 are items employed when storing the drawing information that has been split off by the splitter section 11. This will be described in detail later.

When the reception section 13 is instructed to transition to or exit a modification mode for modifying drawings, the reception section 13 communicates this fact to the editing section 14. For example, the reception section 13 receives the fact that the pause button in the command button panel 43 has been selected, and that one of the hand-drawing tools 46 has been selected, as an instruction to transition to the modification mode. Moreover, the reception section 13 receives the fact that, when in a paused state, the pause button has been selected again, or that the playback button in the command button panel 43 has been selected, as an instruction to exit the modification mode.

Using the frame information output from the video playback section 12 as a trigger, the editing section 14 generates drawing information in units of the display duration of each frame, based on the hand-drawing input information stored in the hand-drawn information table 21.

Specifically, the editing section 14 obtains all of the hand-drawing input information from the hand-drawn information table 21 at a timing at which the frame information is output, and extracts the first (oldest in terms of acquisition time) hand-drawing input information and the last (newest in terms of acquisition time) hand-drawing input information. The editing section 14 sets a position expressed by the position information included in the first hand-drawing input information as a start point, and sets a position expressed by the position information included in the last hand-drawing input information as an end point. Moreover, as will be described in detail later, when drawing information split off by the splitter section 11 is stored in the hand-drawn information table 21, the respective hand-drawing input information is set with a "start point flag" or an "end point flag". In such cases, the editing section 14 sets the positions expressed by the position information included in the hand-drawing input information set with a "start point flag" and an "end point flag" as the start point and the end point.

The editing section 14 then uses the position information of the start point and the end point together with the information relating to the size and color of the line, operations, and ID included in the first or the last hand-drawing input information, to generate drawing information for frame with the frame number indicated by the output frame information.

Figure 5:
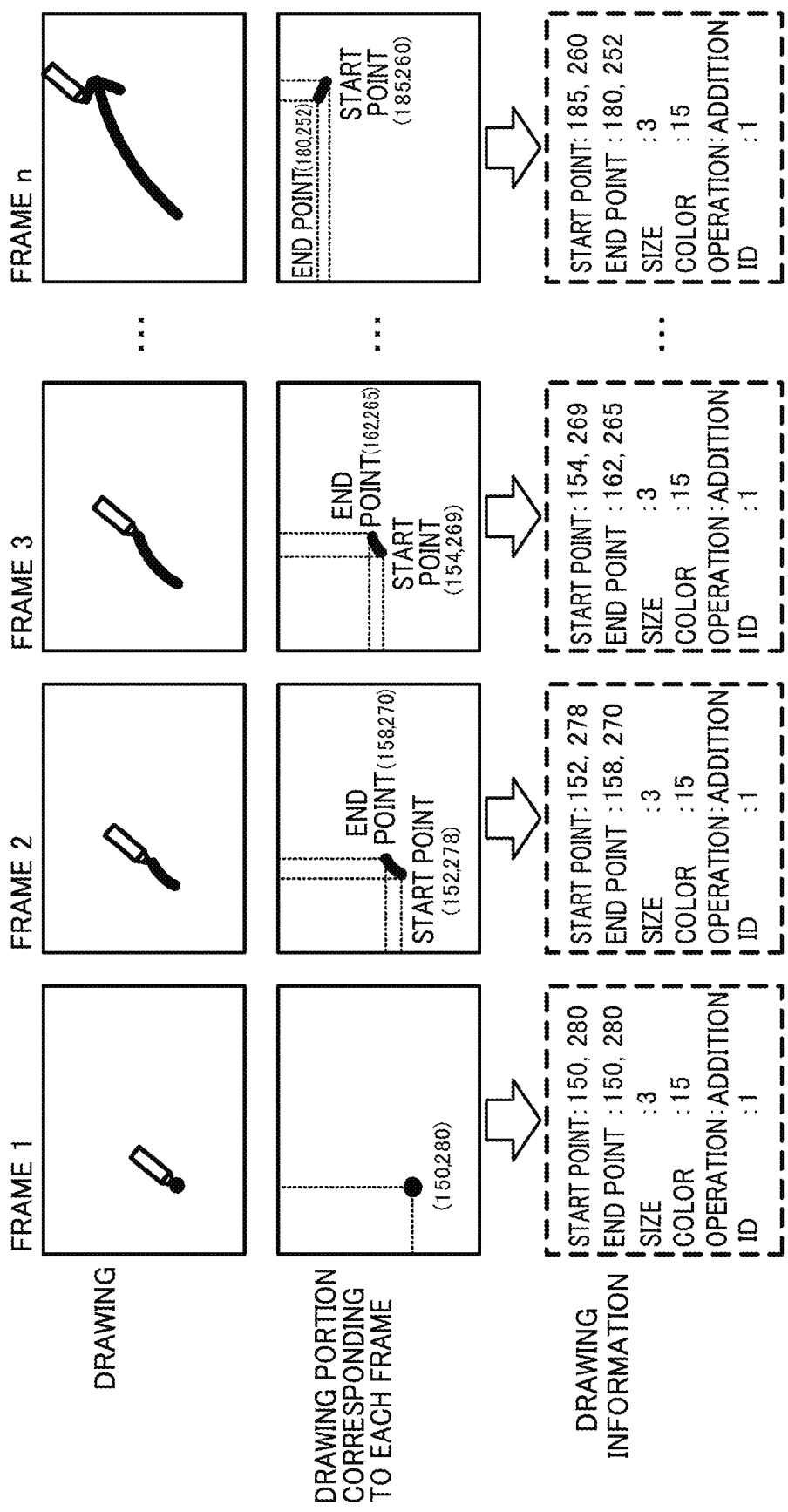
FIG. 5 is a diagram to explain addition of a drawing during video playback.

By way of an example, explanation follows regarding an example in which a drawing is added using the pencil tool during playback of a video expressed by the consecutive frames of frame 1, frame 2, frame 3, . . . , frame n, as illustrated in FIG. 5.

The top row in FIG. 5 illustrates the progress of drawing with the passage of each frame duration. The middle row in FIG. 5 illustrates the position information of the start points and the end points in the drawing between frame 1 and frame n, when only the portions corresponding to each frame are extracted. For example, at the display timing of frame 1, only a point at an X coordinate of 150 and a Y coordinate of 280 (expressed using the format "(X, Y)" hereafter) is drawn. Frame 2 is the frame displayed following frame 1, and at the display timing of frame 2, a portion between a start point of (152, 278) and an end point of (158, 270) is drawn.

As described above, the editing section 14 uses the start points and the end points together with other hand-drawing input information to generate drawing information for each frame, as illustrated in the bottom row of FIG. 5. Since the position information included in the respective drawing information includes only the position information of the start points and the end points, a drawing expressed by each set of drawing information is configured by a straight line connecting the start point and the end point together. For example, the drawing information for frame 2 refers to a straight line drawn from (152, 278) to (158, 270).

In this manner, a drawing hand-drawn over respective frames is understood and quantified as a collection of short straight lines. This thereby enables the amount of information to be reduced in comparison to cases in which position information of all of the pixels expressing the drawing are recorded. Generally, at a video frame rate of 30 fps, the display duration of a single frame is approximately 33 ms, and the points or lines that a person can input by hand within this duration are very limited. Accordingly, the loss of precision in the displayed drawing is small, even if the drawing portions are handled as short straight lines in frame units, and a collection of these short straight lines are displayed so as to give the impression of a curved line. Note that the drawing information of an individual frame may be recorded with position information for all of the pixels expressing the drawing that was drawn on that particular frame. In such cases, the amount of recorded information increases, but the precision of the displayed drawing becomes higher.

Figure 6:
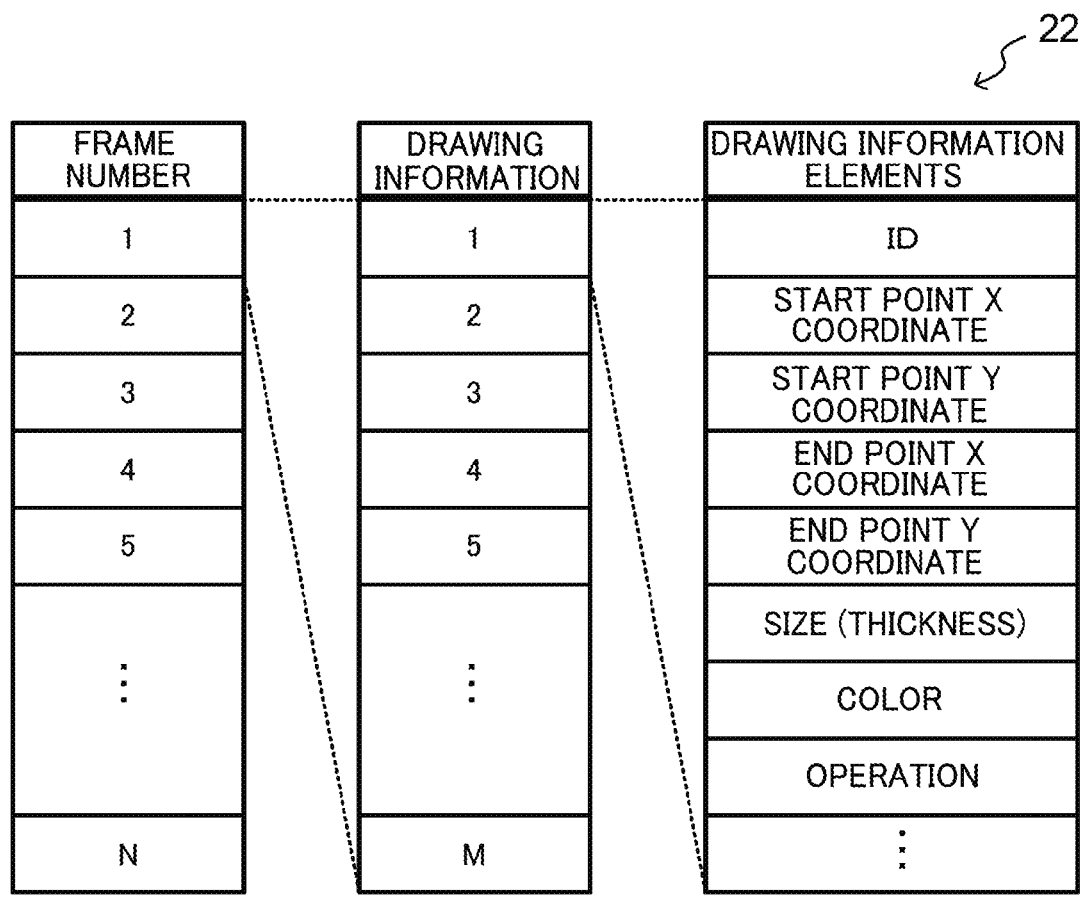
FIG. 6 is a diagram illustrating an example of a drawing information table.

The editing section 14 stores the generated drawing information in a drawing information table of the drawing DB 20. FIG. 6 illustrates an example of a drawing information table 22. FIG. 6 illustrates an example in which plural drawing information can be stored against each frame. Note that the drawing information for frames on which drawing has not been performed is, for example, set to "none" for each element of the drawing information, and the "ID" is set to a value indicating that no drawing information is present (for example, "0"). Namely, the "ID" represents identification information of the drawing information, and also functions as a flag indicating the presence or absence of drawing information for each frame. As a minimum, the drawing information table 22 is stored with drawing information corresponding to one file's worth of frames, in order to generate a combined video stream.

There is a difference in data structure between the hand-drawing input information and the drawing information. Accordingly, in order to store the drawing information split off from the combined video stream by the splitter section 11 described above in the hand-drawn information table 21, the drawing information is split up into hand-drawing input information corresponding to the respective start points and end points included in the drawing information, and stored. More specifically, hand-drawing input information including position information relating to a start point included in the drawing information is set with the "start point flag", and stored. Similarly, hand-drawing input information including position information relating to the end point included in the drawing information is set with the "end point flag", and stored. In cases in which plural items of drawing information are associated with a single frame, "start point flags" and "end point flags" are set so as to be capable of identifying combinations of start points and end points.

Based on the generated drawing information, the editing section 14 updates a search table of associated information of the positions where drawing has been performed, and the frames in which drawing has been performed. The search table is used to ascertain the frame numbers from the positions (coordinates) where drawing has been performed when modifying hand-drawing information that has already been input. FIG. 7 illustrates an example of a search table 23. The number of elements in the search table 23 illustrated in FIG. 7 is the same as the number of pixels in the playback region 42. For example, if the size of the playback region 42 is 640×480 pixels, the search table 23 includes 640× 480=307200 elements. In the search table 23 illustrated in FIG. 7, for each pixel in the playback region 42, the frame number of a frame in which drawing has been performed at that pixel is stored associated with the X coordinate and the Y coordinate of that pixel. Note that in order to allow for drawing being performed repeatedly at the same pixel, plural frame numbers can be associated with and stored against a single pixel. Note that the number of frame numbers that can be associated with a single pixel may be a predetermined number (the five drawing histories 1 to 5 in the example of FIG. 7). Alternatively, a data structure may be employed in which the fields for storing frame numbers are varied in order to allow unlimited storage.

Figure 8:
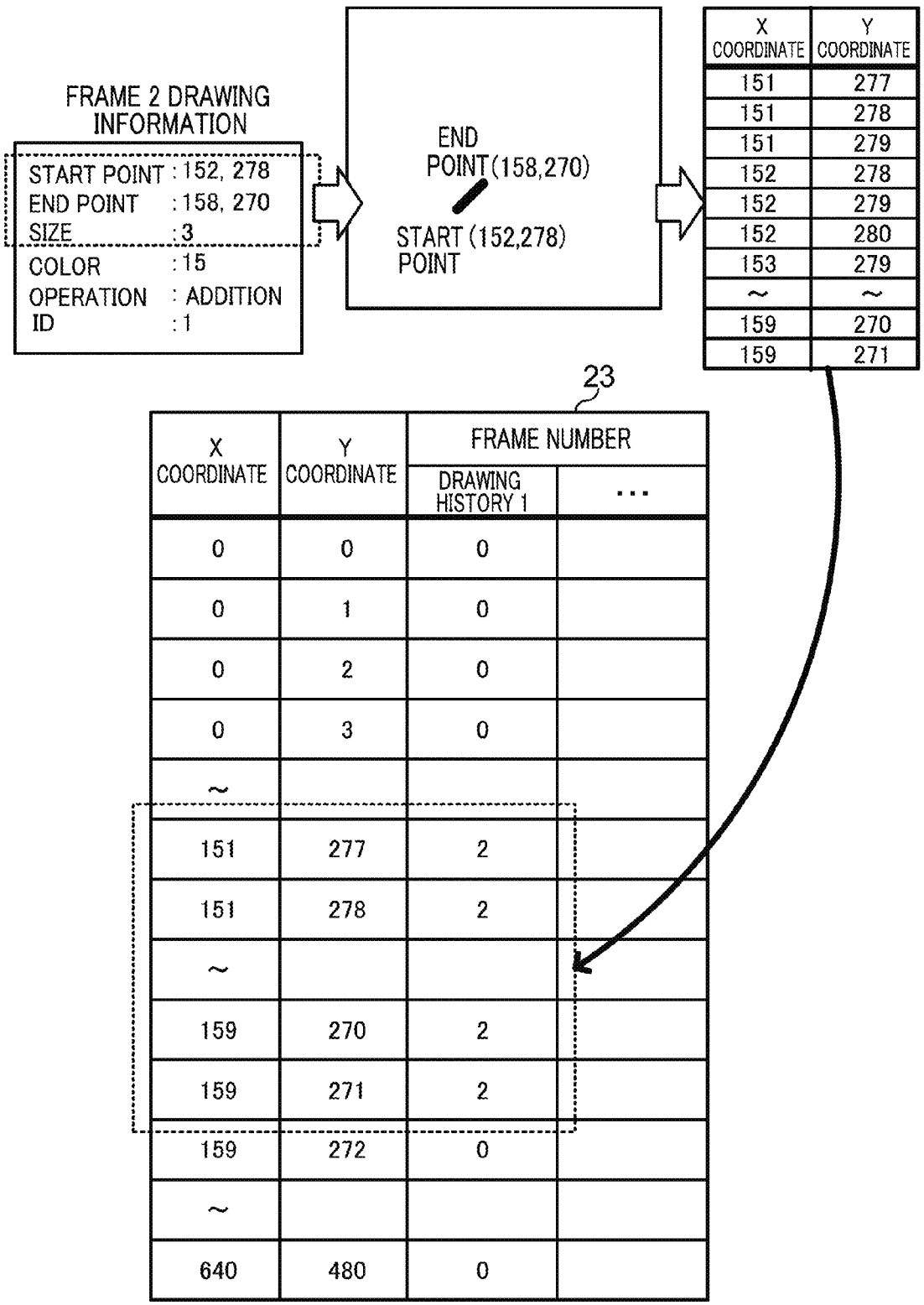
FIG. 8 is a diagram to explain updating a search table.

Specifically, the editing section 14 finds the pixels that are drawing targets for a frame i, based on the straight line connecting the start point and the end point, and the size of the line, included in the drawing information for the frame i. For example, in the example illustrated in FIG. 8, a start point of (152, 278), an end point of (158, 270), and a size (thickness) of 3 pixels are obtained from the drawing information for frame 2. From this information, the editing section 14 ascertains the pixels along a straight line connecting the start point of (152, 278) and the end point of (158, 270) together, and one pixel on both sides of each pixel along the straight line so as to give a line size of 3 pixels when these are combined with the pixels along the straight line. Moreover, the editing section 14 stores "i" ("2" in the example of FIG. 8) in the frame number field corresponding to each of the ascertained pixels in the search table 23. Note that in the example of the search table 23 in FIG. 7 and FIG. 8, fields with a frame number of "0" indicate an initial state in which no frame number has been recorded. Accordingly, the editing section 14 records frame numbers in the frame number fields in the initial state, in the sequence drawing history 1, drawing history 2, and so on.

Figure 9:
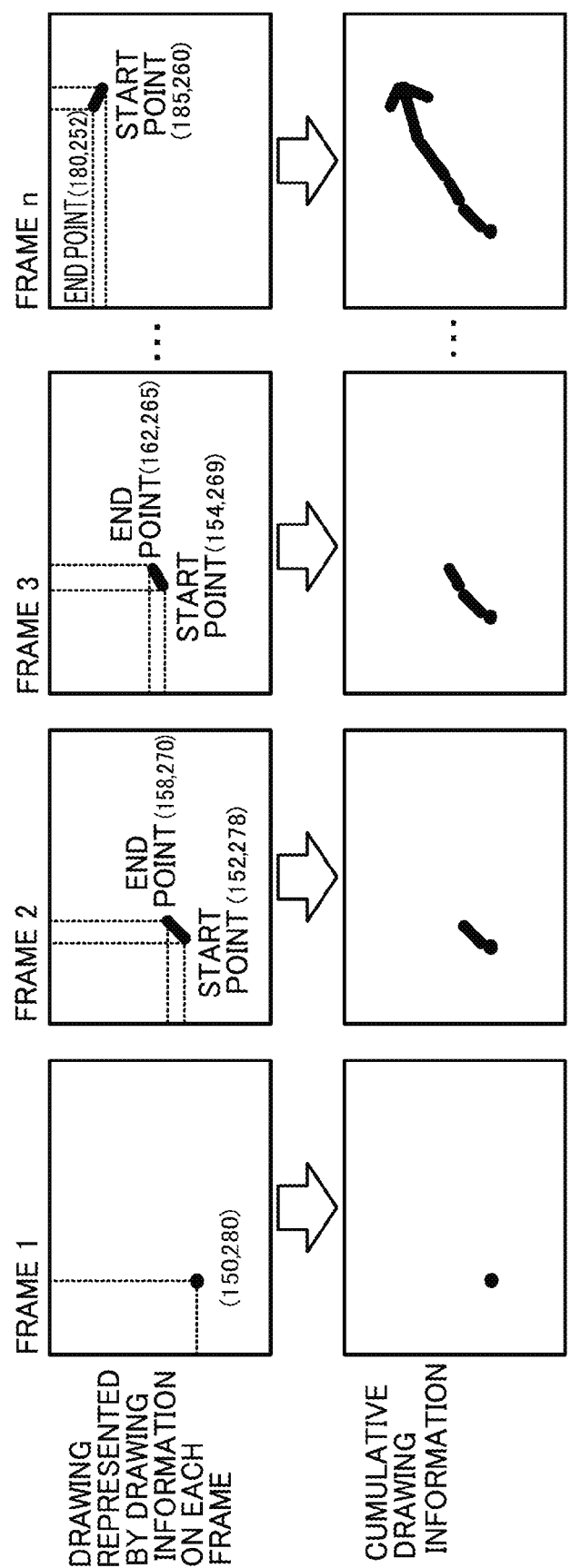
FIG. 9 is a diagram to explain generation of cumulative drawing information in a case in which a drawing is added during video playback.

Based on the generated drawing information, the editing section 14 generates cumulative drawing information expressing the drawing for display overlaid on the video. As described above, individually, the drawing information only includes information relating to a drawing portion corresponding to an individual frame. The drawing information of each of the frames is therefore accumulated to form an image of the drawing that was hand-drawn in reality. Specifically, the editing section 14 adds the generated drawing information to the cumulative drawing frame memory 26 each time drawing information is generated for an individual frame. For example, FIG. 9 illustrates an example of cumulative drawing information generated by sequentially adding the drawing information of the individual frames of frame 1 to frame n, generated as illustrated in FIG. 5. In this manner, the cumulative drawing information is generated in a single frame memory, thereby enabling the amount of information that needs to be retained as the drawing information to be suppressed from increasing. Note that the cumulative drawing frame memory 26 is provided for each ID included in the drawing information.

Figure 10:
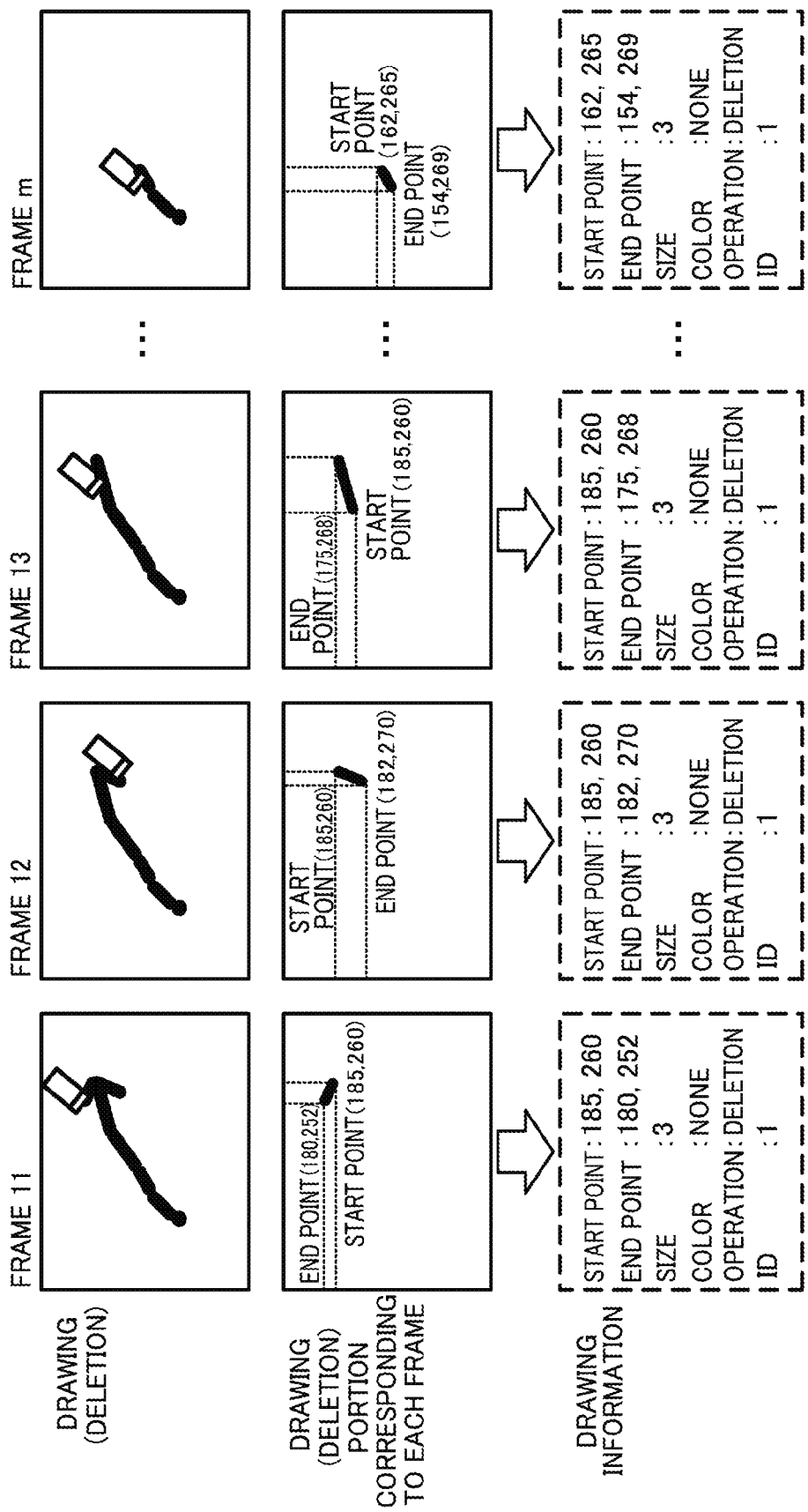
FIG. 10 is a diagram to explain deletion of a drawing during video playback.

The drawing expressed by the cumulative drawing information generated as described above is displayed on the display device 32 using the combining section 15, described later. It is possible to delete the displayed drawing using the eraser tool. FIG. 10 illustrates an example in which a drawing is deleted using the eraser tool during playback of a video expressed by the consecutive frames from frame 11, frame 12, frame 13, . . . , up to frame m. The hand-drawing input information includes position information of the drawing deleted using the eraser tool, thereby enabling a start point and an end point to be obtained for each frame at which the drawing is deleted, similarly to when adding to a drawing, so as to generate drawing information such as that illustrated in the bottom row in FIG. 10.

When the operation content included in the drawing information for a frame i is "deletion", in the search table 23, the editing section 14 returns the frame number stored associated with the pixels ascertained based on the drawing information for frame i to the initial value. In cases in which plural frame numbers are stored associated with that pixel in the search table 23, a frame number selected by following predetermined rules is returned to the initial value. For example, the frame number closest to the frame i may be selected, or a recently stored frame number (having the highest number in the drawing history) may be selected.

Figure 11:
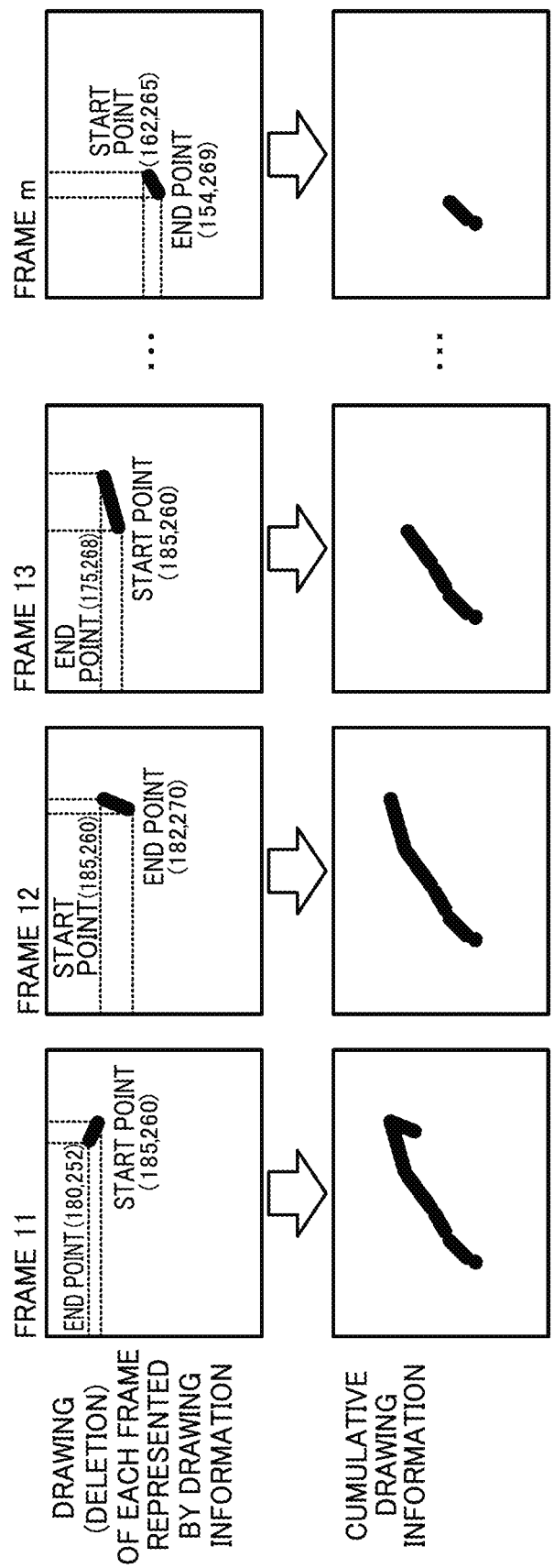
FIG. 11 is a diagram to explain generation of cumulative drawing information in a case in which a drawing is deleted during video playback.

Moreover, when the operation content included in the drawing information is "deletion", the editing section 14 deletes from the cumulative drawing frame memory 26 information relating to pixels corresponding to the pixels ascertained based on the drawing information, so as to delete a target portion from the cumulative drawing information. FIG. 11 illustrates an example of the cumulative drawing information generated by sequentially adding the drawing information of each frame from frame 11 to frame m, generated as illustrated in FIG. 10. In this manner, the drawing can be displayed so as to include the progress of deletion when a drawing is deleted during video playback.

When a clear all button (not illustrated in the drawings) for the drawing information has been selected, the editing section 14 deletes all of the drawing information in the drawing information table 22, and all of the cumulative drawing information stored in the cumulative drawing frame memory 26. The editing section 14 also returns all of the frame numbers in the search table 23 to the initial value.

Moreover, when the editing section 14 is notified of a transition to the modification mode by the reception section 13, the editing section 14 pauses the video that is being played back in the playback region 42, and updates the drawing DB 20 based on the modification to the drawing overlaid on the paused frame image.

Specifically, when the drawing on the paused frame is deleted, the editing section 14 acquires the hand-drawing input information with the operation content of "deletion", received by the reception section 13 and stored in the hand-drawn information table 21 while the frame is paused. The editing section 14 ascertains each pixel of the drawing that has been deleted using the eraser tool from the position information included in the acquired hand-drawing input information, and refers to the search table 23 to ascertain the frame numbers stored associated with the ascertained pixels. In cases in which plural frame numbers are stored associated with an ascertained pixel, a frame number is selected by following predetermined rules. Namely, the editing section 14 functions as an ascertaining section that ascertains the frame number associated with a pixel received as an editing target. The editing section 14 then deletes the drawing information of the ascertained frame numbers from the drawing information table 22. The editing section 14 also returns the frame numbers ascertained from the respective pixels of the deleted drawing to the initial value in the search table 23.

Figure 12:
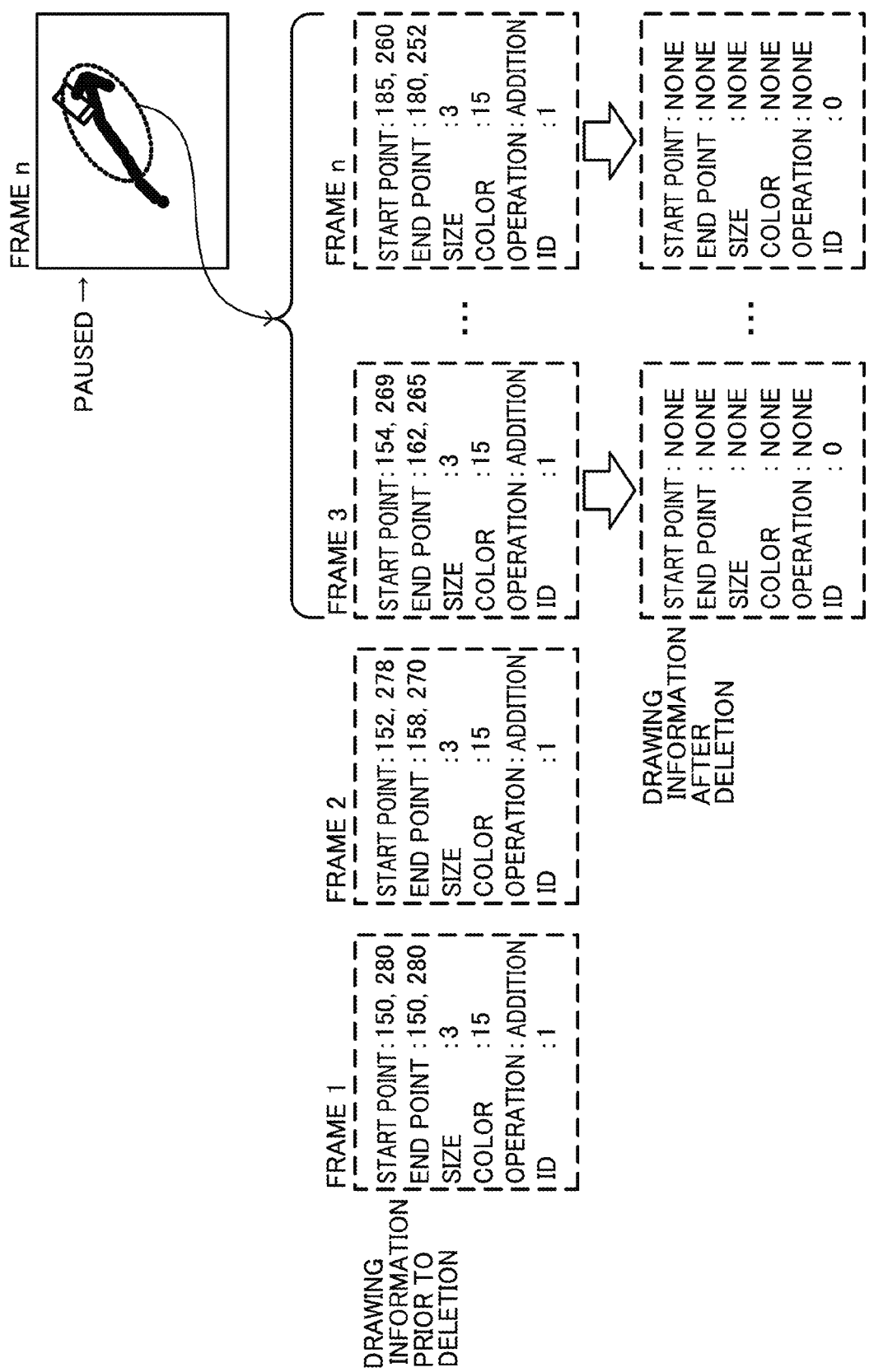
FIG. 12 is a diagram to explain deletion of a drawing in a modification mode.

For example, suppose that, as illustrated in the top row of FIG. 12, transition to the modification mode is made at frame n, and a portion of the drawing displayed in frame n (in the elliptical region in the top row in FIG. 12), namely a specific region in the drawing, is deleted using the eraser tool. The search table 23 is then referenced, and frame 3 to frame n are ascertained using the respective pixels of the deleted drawing portion. In this case, the editing section 14 deletes the drawing information of the ascertained frame 3 to frame n as illustrated in the middle row and the bottom row of FIG. 12.

In the modification mode, when the pencil tool is selected and addition of a drawing begins, the editing section 14 outputs simulated frame information according to a timer. The simulated frame information is simulated frame information that is sequentially output starting at the time when drawing addition begins, and is output at the same frame rate as that of the frame information that is output coupled with the output of the frame images by the video playback section 12, while the frame image that is being displayed remains in a paused state. Note that as the simulated frame information, the frame numbers of the frames from which the drawing information has been deleted are output in sequence, starting from the earliest (lowest number). Moreover, it is conceivable that there will be cases in which addition of a drawing continues even after outputting simulated frame information for the frame number of the final frame out of the frames from which the drawing information has been deleted. In such cases, simulated frame information representing the frame number of any of the frames from which the drawing information has been deleted (for example, the final frame) is output repeatedly until addition of the drawing has been completed.

Figure 13:
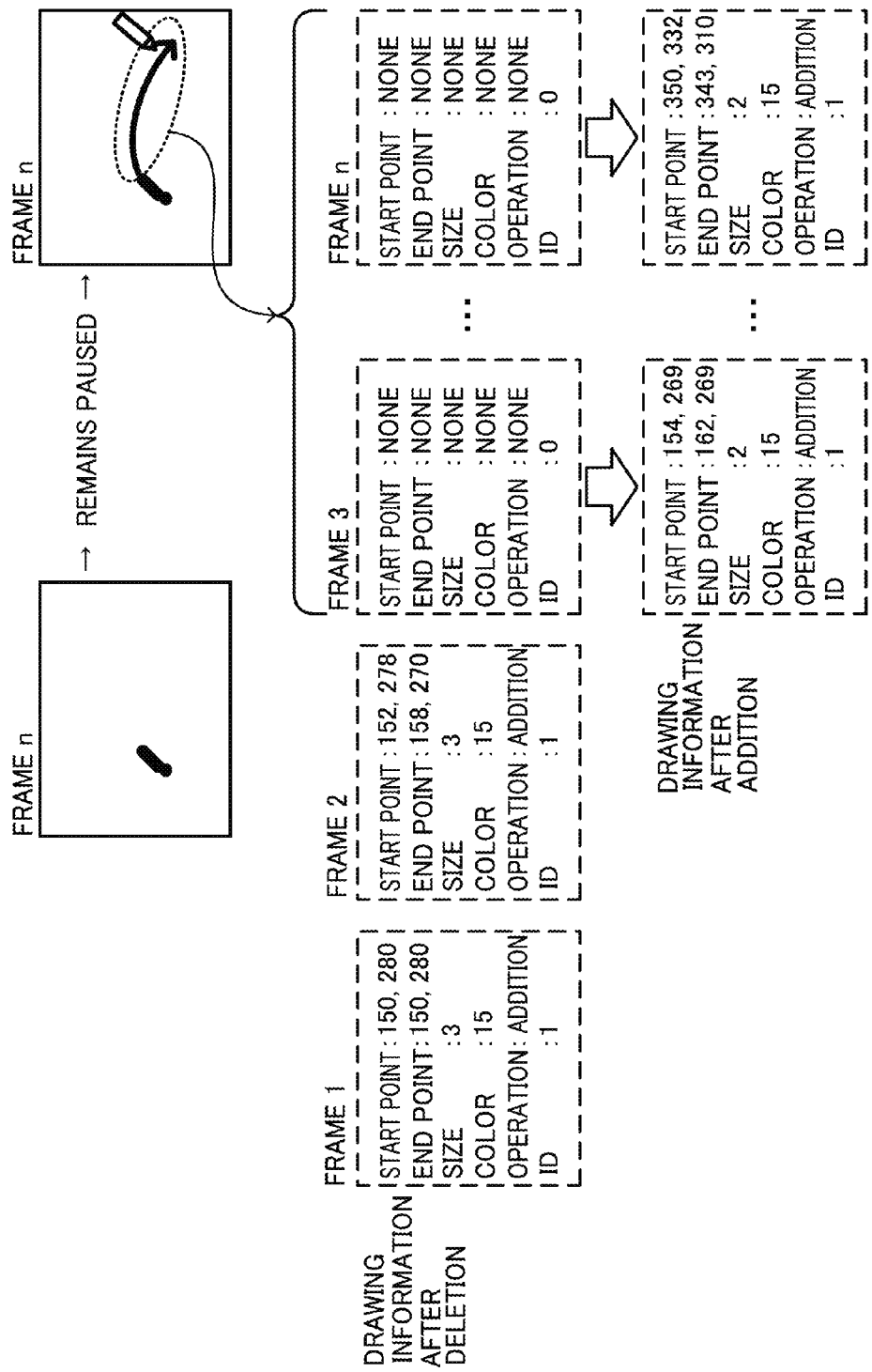
FIG. 13 is a diagram to explain addition of a drawing in a modification mode.

Similarly to when normal frame information is used as a trigger, the editing section 14 generates drawing information expressing the drawing hand-drawn on the paused frame image using the simulated frame information as a trigger. For example, suppose that the hand-drawn drawing portion illustrated in the top row of FIG. 13 (in the elliptical region in the top row of FIG. 13) is added following the deletion of the drawing information of frame 3 to frame n, as illustrated in the example of FIG. 12. While the drawing portion is being added, the simulated frame information output from the video playback section 12 is used as a trigger, and drawing information such as that illustrated in the bottom row of FIG. 13 is generated for frame 3 to frame n.

Note that in cases in which the addition of a drawing is completed before the simulated frame information corresponding to the final frame of the frames from which the drawing information has been deleted is output, the drawing information of the frames corresponding to the remaining simulated frame information remains in a deleted state. Moreover, it is conceivable that there will be cases in which addition of a drawing continues after the simulated frame information corresponding to the final frame of the frames from which the drawing information has been deleted has been output. In such cases, simulated frame information representing any frame out of the frames from which the drawing information has been deleted (for example the final frame, this being frame n in the example of FIG. 13) is output, and so plural items of drawing information may be associated with the frame number indicated by this simulated frame information. Moreover, the editing section 14 may reassign the plural items of drawing information generated for the added drawing so as to be contained within the number of frames from which the drawing information has been deleted.

Accordingly, even if drawing editing (deletion or addition) is performed on a single frame, internally speaking, the search table 23 is employed to backtrack to a frame to be modified, enabling the drawing information representing an hand-drawn drawing that has already been written to be partially modified.

It is moreover conceivable that after transitioning to the modification mode, a drawing may be added without deleting any drawings. In such cases, the editing section 14 outputs simulated frame information indicating the frame number of a paused frame (the frame n in the example in FIG. 13) on which additional drawing is performed to the video playback section 12. The plural items of drawing information representing the additional drawing are thereby associated with the paused frame.

The combining section 15 displays a combined screen, in which the drawing expressed by the cumulative drawing information stored in the cumulative drawing frame memory 26 is overlaid on the frame images passed from the video playback section 12, in the playback region 42. The cumulative drawing frame memory 26 is provided for each ID included in the drawing information, and so the combining section 15 overlays drawings expressed by the cumulative drawing information stored in the cumulative drawing frame memory 26 corresponding to the ID selected using the ID selection button 44.

Figure 14:
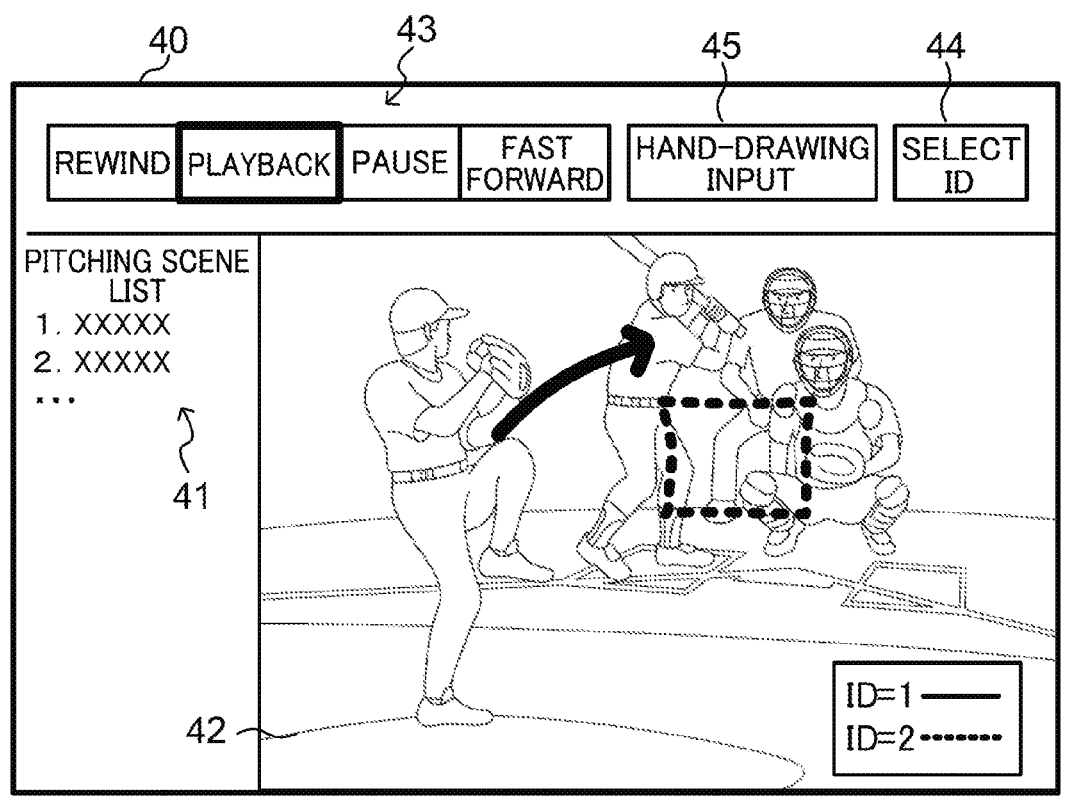
FIG. 14 is a diagram to explain how drawings are displayed by ID.

Note that there is no limitation to a single selectable ID, and in cases in which plural IDs have been selected, the combining section 15 displays plural overlaid drawings corresponding to the respective selected IDs. When this is performed, as illustrated in FIG. 14, the combining section 15 may display drawings expressed by the drawing information with different colors and line characteristics for each ID included in the drawing information. When no ID is selected, the frame images of the video data may be displayed alone without overlaying drawings.

The combining section 15 performs display control, for example display of the respective buttons on the screen 40 illustrated in FIG. 2, display of menus when the respective buttons are selected, and highlighted display of selected buttons.

When one file's worth of video data has been collected in the video delay buffer 24, the multiplexing section 16 multiplexes the one file's worth of video data with one file's worth of drawing information collected in the drawing information table 22 to generate the combined video stream. In the present exemplary embodiment, there is no particular limitation to the multiplexing format, as long as the drawing information is stored in frame units. However, employing a widely-used multiplexing method enables video expressed by the video data of the combined video stream to be played back by itself, even when using a decoder that does not have the functionality to overlay display of the drawings expressed by the drawing information.

Here, as an example, explanation follows regarding a case in which the video data and the drawing information are multiplexed using an MPEG-2 Transport Stream (TS) widely employed by various streaming services.

Figure 15:
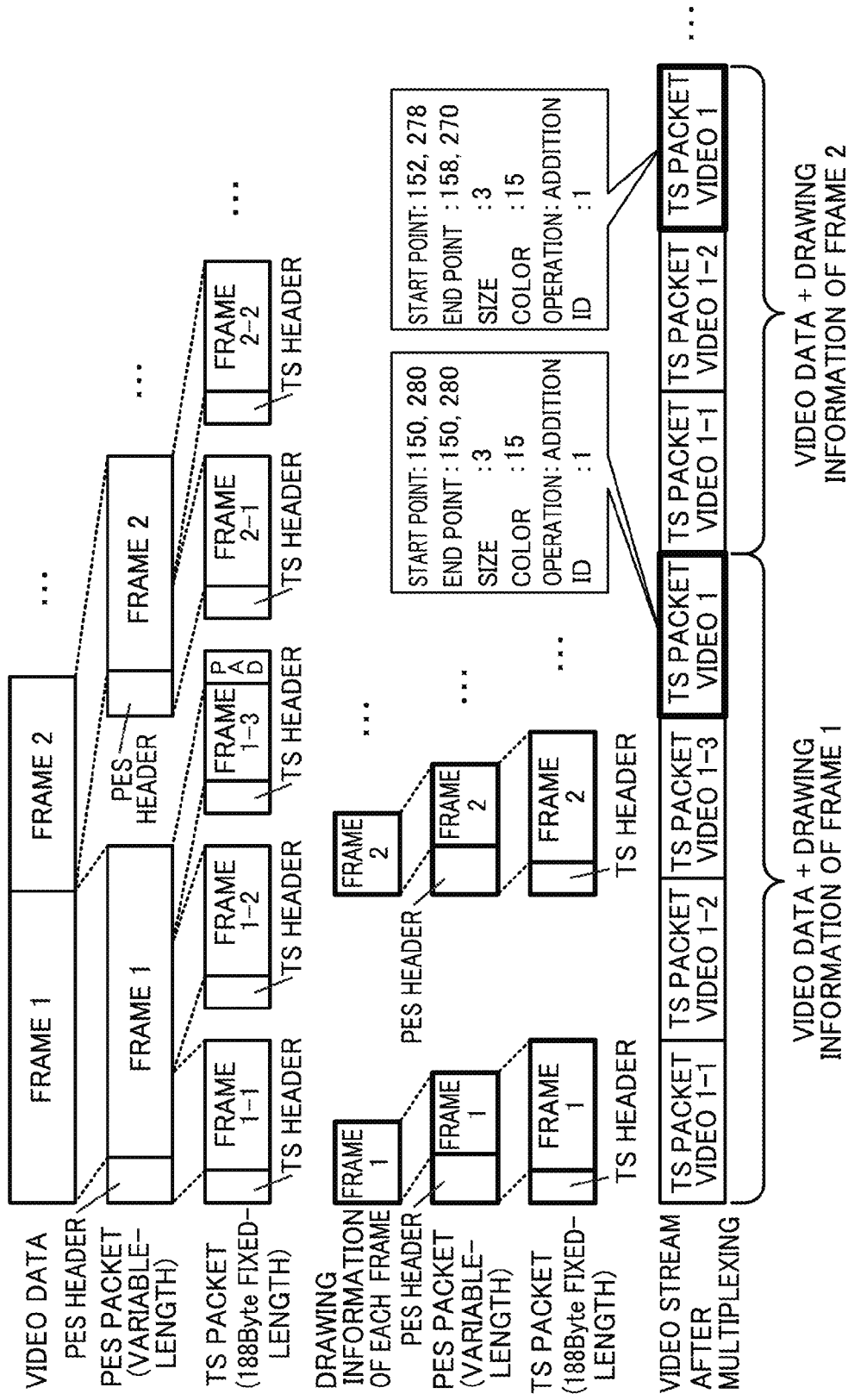
FIG. 15 is a diagram to explain multiplexing of video data and drawing information.

As illustrated in FIG. 15, the multiplexing section 16 divides the video data into variable-length Packetized Elementary Stream (PES) packets in frame units, and further divides the PES packets into fixed-length (188 byte) TS packets. The multiplexing section 16 moreover converts the drawing information into PES packets, and then into TS packets, for each frame. The multiplexing section 16 then multiplexes the video data and the drawing information by combining the TS packets of the video data with the TS packets of the drawing information for each frame, arranged in frame sequence. This method bundles the video data with the drawing information for each frame, such that it is easy to synchronize the video data and the drawing information during playback.

Figure 16:
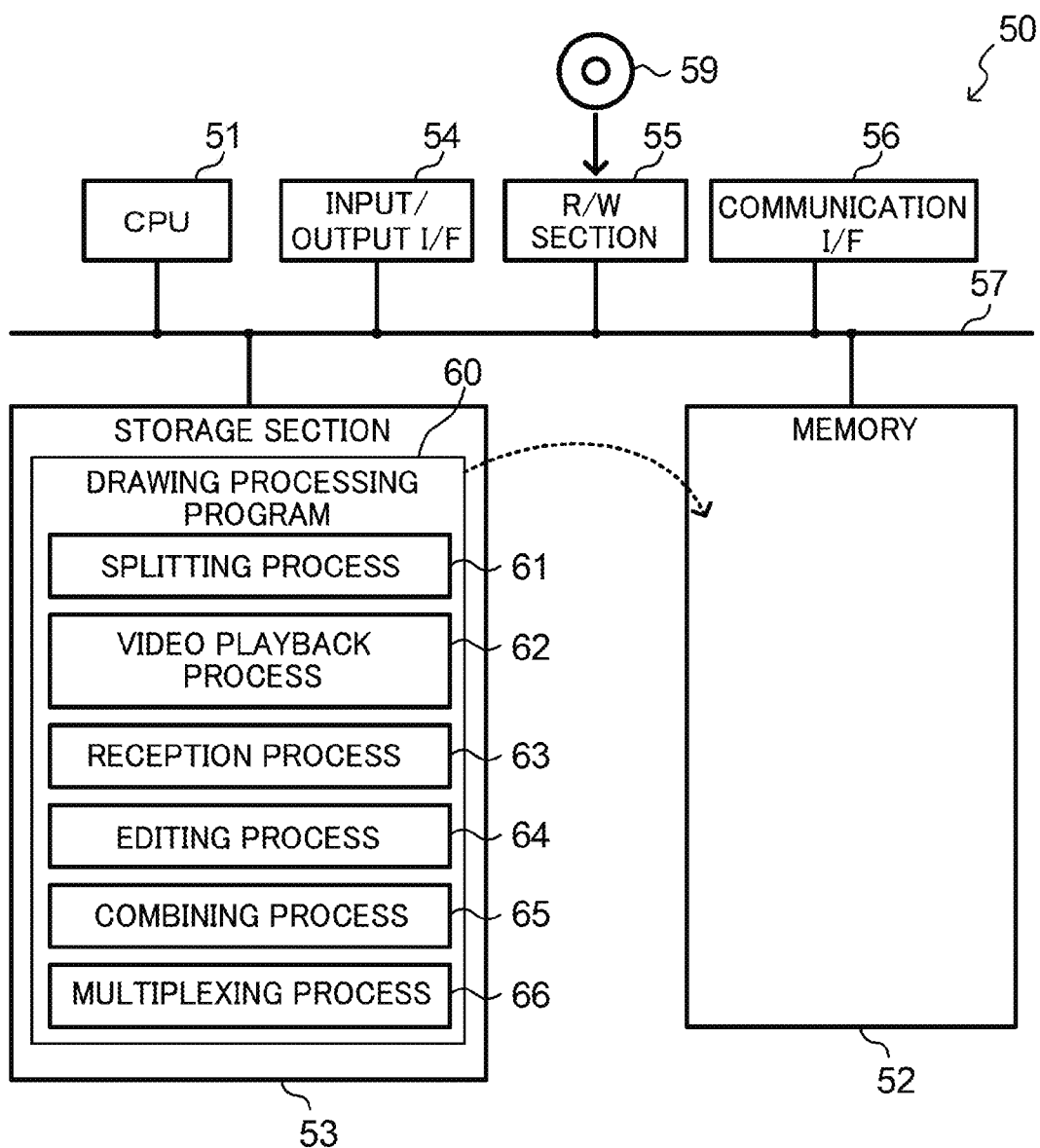
FIG. 16 is a block diagram illustrating a schematic configuration of a computer that functions as a drawing processing device.

The drawing processing device 10 may, for example, be implemented by a computer 50, illustrated in FIG. 16. The computer 50 includes a CPU 51, memory 52 serving as a temporary storage region, and a non-volatile storage section 53. The computer 50 further includes an input/output interface (I/F) 54 to which the hand-drawing input device 30 and the display device 32 are connected, a read/write (R/W) section 55 that controls reading and writing of data with respect to a recording medium 59, and a communication I/F 56. The CPU 51, the memory 52, the storage section 53, the input/output I/F 54, the R/W section 55, and the communication I/F 56 are connected together through a bus 57.

The storage section 53 may be implemented by a Hard Disk Drive (HDD), a solid state drive (SSD), flash memory, or the like. The storage section 53 may hold the drawing DB 20, the video delay buffer 24, and the cumulative drawing frame memory 26. The storage section 53, serving as a recording medium, is stored with a drawing processing program 60 that causes the computer 50 to function as the drawing processing device 10. The drawing processing program 60 includes a splitting process 61, a video playback process 62, a reception process 63, an editing process 64, a combining process 65, and a multiplexing process 66.

The CPU 51 reads the drawing processing program 60 from the storage section 53 and expands the drawing processing program 60 in the memory 52, and executes the processes of the drawing processing program 60 in sequence. The CPU 51 operates as the splitter section 11 illustrated in FIG. 1 by executing the splitting process 61. The CPU 51 operates as the video playback section 12 illustrated in FIG. 1 by executing the video playback process 62. The CPU 51 operates as the reception section 13 illustrated in FIG. 1 by executing the reception process 63. The CPU 51 operates as the editing section 14 illustrated in FIG. 1 by executing the editing process 64. The CPU 51 operates as the combining section 15 illustrated in FIG. 1 by executing the combining process 65. The CPU 51 operates as the multiplexing section 16 illustrated in FIG. 1 by executing the multiplexing process 66. The computer 50 running the drawing processing program 60 accordingly functions as the drawing processing device 10.

Note that the functions implemented by the drawing processing program 60 may also be implemented by, for example, a semiconductor integrated circuit, and more specifically, by an Application Specific Integrated Circuit (ASIC) or the like.

Next, explanation follows regarding operation of the drawing processing device 10 according to the present exemplary embodiment. When an application provided by the drawing processing device 10 is started, the combining section 15 displays the screen 40 on the display device 32, as illustrated in FIG. 2, for example. Note that video playback in the playback region 42 is not performed at this stage. When the hand-drawing input button 45 on the screen 40 is selected by a user, the drawing processing device 10 executes hand-drawn information collection processing, illustrated in FIG. 17. When the user selects a video stream for playback from the list display region 41, the selected video stream is input to the drawing processing device 10, and the drawing processing device 10 executes the drawing processing illustrated in FIG. 18.

Figure 17:
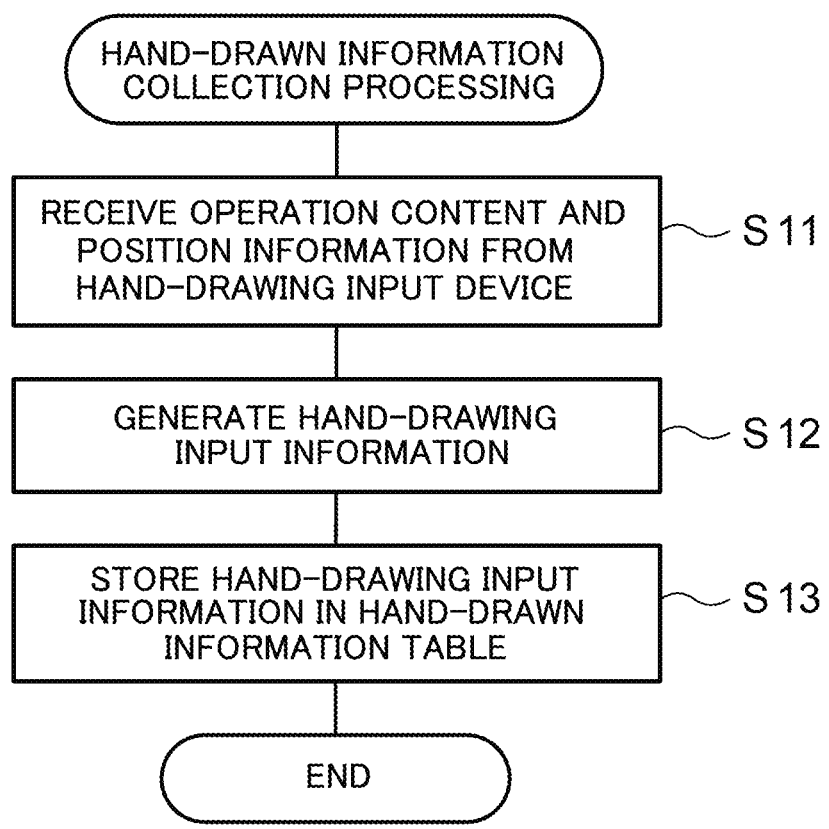
FIG. 17 is a flowchart illustrating an example of hand-drawn information collection processing.

At step S11 of the hand-drawn information collection processing illustrated in FIG. 17, the reception section 13 receives operation content, and position information indicating the position where hand-drawing has been performed, input from the hand-drawing input device 30 as operation information for the hand-drawing tool 46.

Next, at step S12, the reception section 13 associates together the operation content and position information received from the hand-drawing input device 30, the size and color of the selected pencil tool, and information of the set ID, and generates the hand-drawing input information.

Next, at step S13, the reception section 13 stores the generated hand-drawing input information in the hand-drawn information table 21 of the drawing DB 20, and ends the hand-drawn information collection processing. The hand-drawn information collection processing is repeated at a specific timing (for example, every 1 msec) while the hand-drawing input button 45 is selected.

Figure 18:
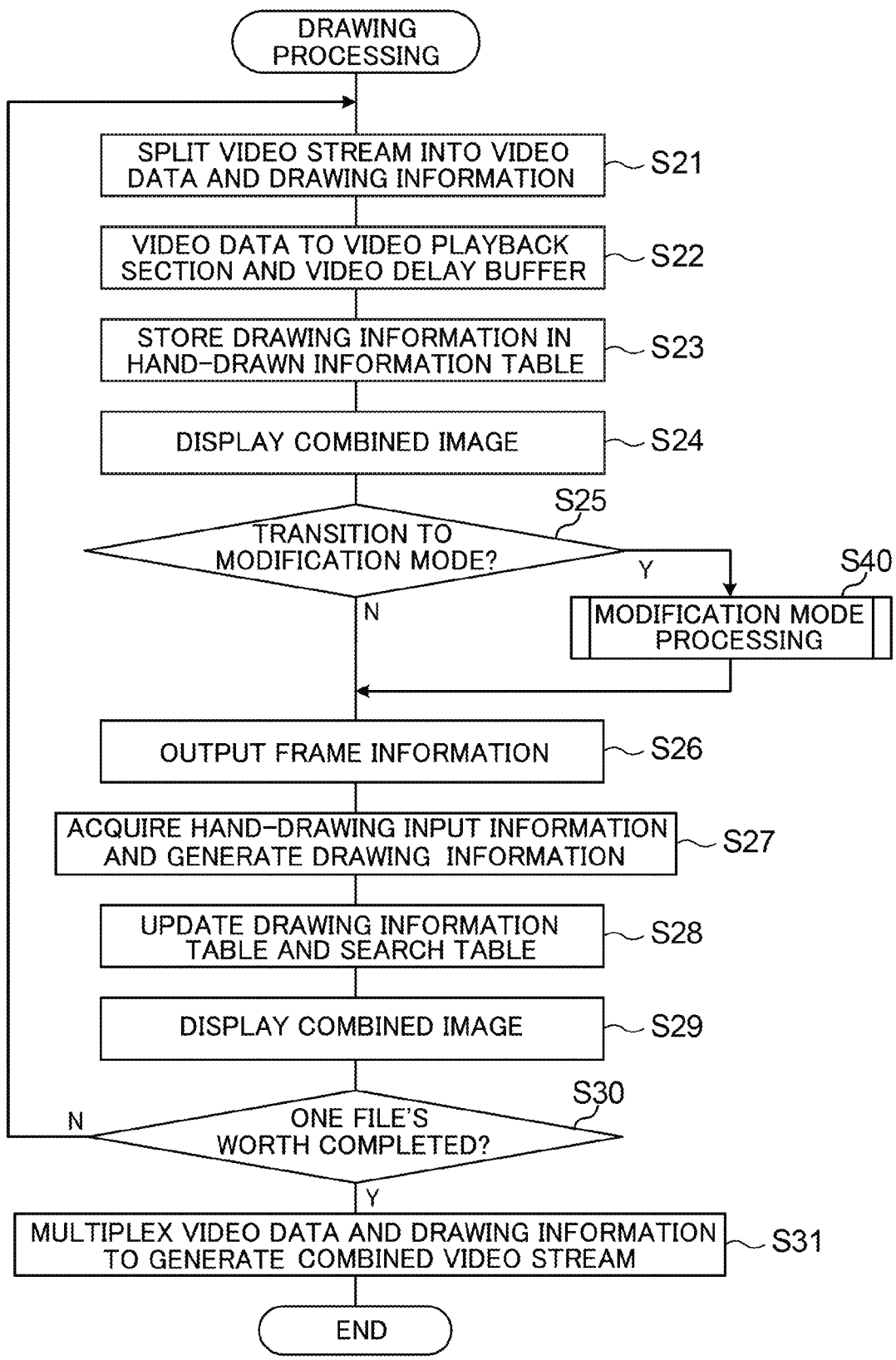
FIG. 18 is a flowchart illustrating an example of drawing processing.

At step S21 of the drawing processing illustrated in FIG. 18, the splitter section 11 splits up the input video stream into video data and drawing information. Next, at step S22, the splitter section 11 passes the split-off video data to the video playback section 12, and stores the split-off video data in the video delay buffer 24. Next, at step S23, the splitter section 11 splits up the split-off drawing information into hand-drawing input information corresponding to the start points included in the drawing information, and hand-drawing input information corresponding to the end points included in the drawing information. The split-off hand-drawing input information is stored in the hand-drawn information table 21 of the drawing DB 20.

Note that in cases in which the input video stream is an original video stream, namely in cases in which drawing information is not included, the processing of step S21 and step S23 is skipped.

Next, at step S24, the video playback section 12 decodes the video data passed from the splitter section 11, and outputs frame images, each corresponding to a single frame, to the combining section 15 at a specific frame rate (for example, 30 fps). The combining section 15 displays in the playback region 42 a combined image, in which the frame image passed from the video playback section 12 is overlaid with an image expressed by the cumulative drawing information stored in the cumulative drawing frame memory 26. Note that only the frame image is displayed in a state in which cumulative drawing information is not stored in the cumulative drawing frame memory 26.

Next, at step S25, the reception section 13 determines whether or not transition to the modification mode has been received. For example, the reception section 13 determines that an instruction to transition to the modification mode has been received in cases in which the pause button in the command button panel 43 has been selected and one of the hand-drawing tools 46 has been selected. Processing transitions to step S40 when an instruction to transition to the modification mode has been received, and processing transitions to step S26 when an instruction to transition to the modification mode has not been received.

At step S26, as frame information, the video playback section 12 outputs to the editing section 14 the frame number corresponding to the frame image output to the combining section 15. Next, at step S27, using the frame information output from the video playback section 12 as a trigger, the editing section 14 acquires the hand-drawing input information stored in the hand-drawn information table 21. Then, based on the acquired hand-drawing input information, the editing section 14 generates drawing information corresponding to the frame number indicated by the frame information output at step S26.

Next, at step S28, the editing section 14 stores the generated drawing information in the drawing information table 22 of the drawing DB 20. Moreover, the editing section 14 stores the frame number indicated by the frame information output at step S26 in the search table 23 associated with the pixels ascertained from the generated drawing information.

Next, at step S29, the editing section 14 adds the generated drawing information to the cumulative drawing frame memory 26 to generate the cumulative drawing information. The combining section 15 then displays in the playback region 42 a combined image in which a drawing expressed by the cumulative drawing information stored in the cumulative drawing frame memory 26 is overlaid on the frame image that is being displayed in the playback region 42.

Next, at step S30, the multiplexing section 16 determines whether or not processing for one file's worth of video stream has been completed by determining whether or not one file's worth of video data has been collected in the video delay buffer 24. When processing for one file's worth of video stream has been completed, processing transitions to step S31. When processing for one file's worth of video stream has not been completed, processing returns to step S21.

At step S31, the multiplexing section 16 multiplexes the one file's worth of drawing information with the one file's worth of video data to generate a combined video stream. The multiplexing section 16 stores the generated combined video stream in a specific storage region or on the recording medium 59, and ends the drawing processing.

Figure 19:
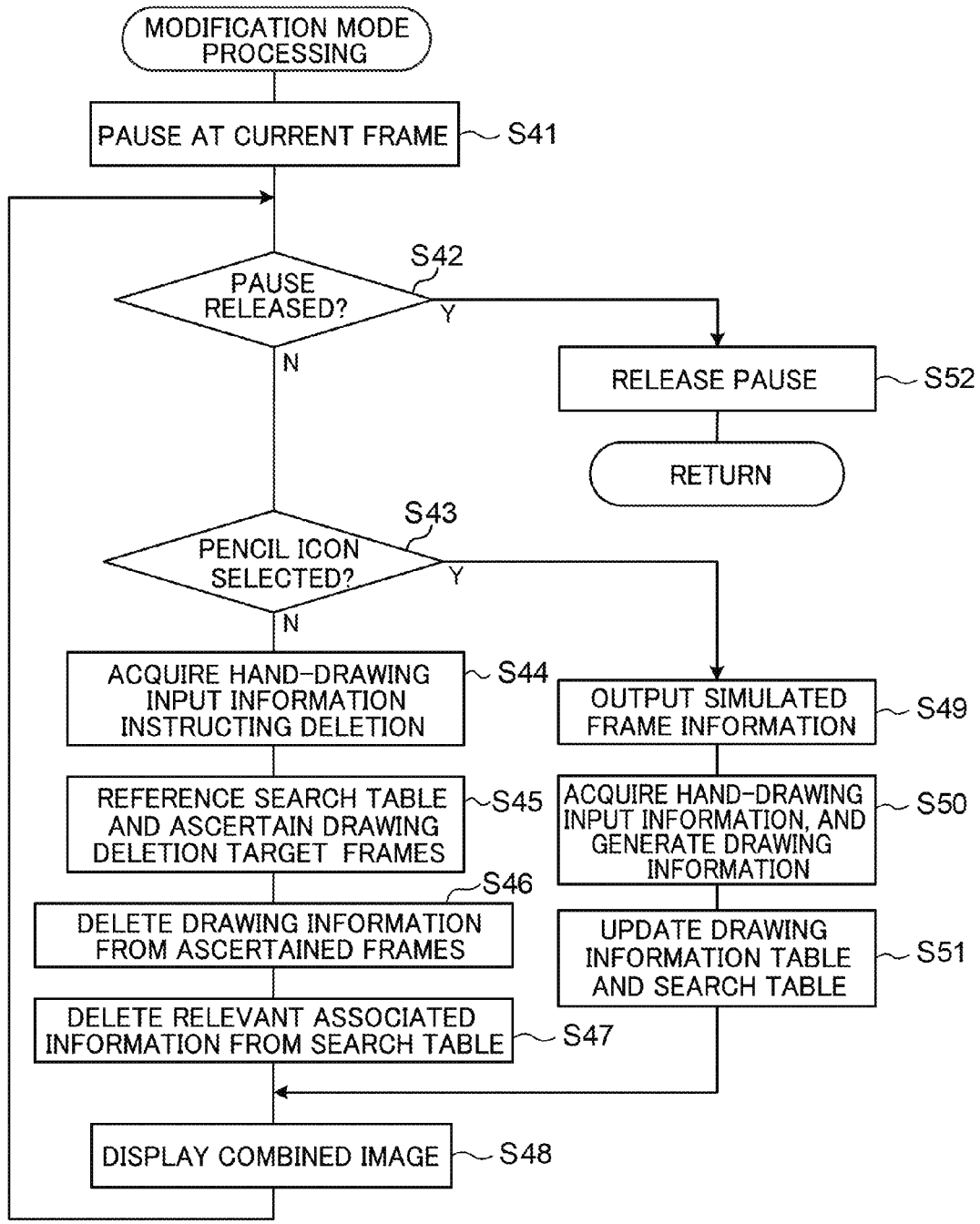
FIG. 19 is a flowchart illustrating an example of modification mode processing.

At step S40, the modification mode processing illustrated in FIG. 19 is executed.

At step S41 of the modification mode processing illustrated in FIG. 19, the editing section 14 performs setting to pause at the frame image or the combined image being displayed in the playback region 42 at the current frame.

Next, at step S42, the reception section 13 determines whether or not pause release has been received, either by the pause button being selected again when in the paused state, or by the playback button in the command button panel 43 being selected. Processing transitions to step S43 when pause release has not been received. At step S43, the reception section 13 determines whether or not the pencil icon has been selected out of the hand-drawing tools 46. When the pencil icon has not been selected, the reception section 13 determines that the eraser icon has been selected, and processing transitions to step S44.

At step S44, the editing section 14 acquires hand-drawing input information with the operation content of "deletion", received by the reception section 13 and stored in the hand-drawn information table 21 while the frame is paused. Next, at step S45, the editing section 14 ascertains each pixel of a drawing that has been deleted using the eraser tool, from the position information included in the acquired hand-drawing input information. The editing section 14 also references the search table 23 to ascertain the frame numbers stored associated with the ascertained pixels. Next, at step S46, the editing section 14 deletes the drawing information from the ascertained frame numbers in the drawing information table 22. Next, at step S47, the editing section 14 returns the frame numbers ascertained at step S45 to their initial values in the search table 23.

Next, at step S48, the editing section 14 generates cumulative drawing information based on the drawing information deleted at step S46, and the combining section 15 displays a combined image. Processing then returns to step S42.

However, when the reception section 13 determines that the pencil icon has been selected out of the hand-drawing tools 46 at step S43, processing transitions to step S49. At step S49, the editing section 14 outputs simulated frame information according to the timer. Next, at step S50, the editing section 14 generates drawing information representing a hand-drawn drawing on the paused frame image, using the simulated frame information as a trigger. Next, at step S51, the editing section 14 stores the drawing information generated at step S50 in the drawing information table 22, and updates the relevant associated information in the search table 23. Processing then transitions to step S48. At step S48, cumulative drawing information is generated based on the drawing information generated at step S50, and the combining section 15 displays a combined image. Processing then returns to step S42.

When the reception section 13 determines that pause release has been received at step S42, processing transitions to step S52. At step S52, the pause set at step S41 is released, and processing returns to the drawing processing (FIG. 18).

Figure 20:
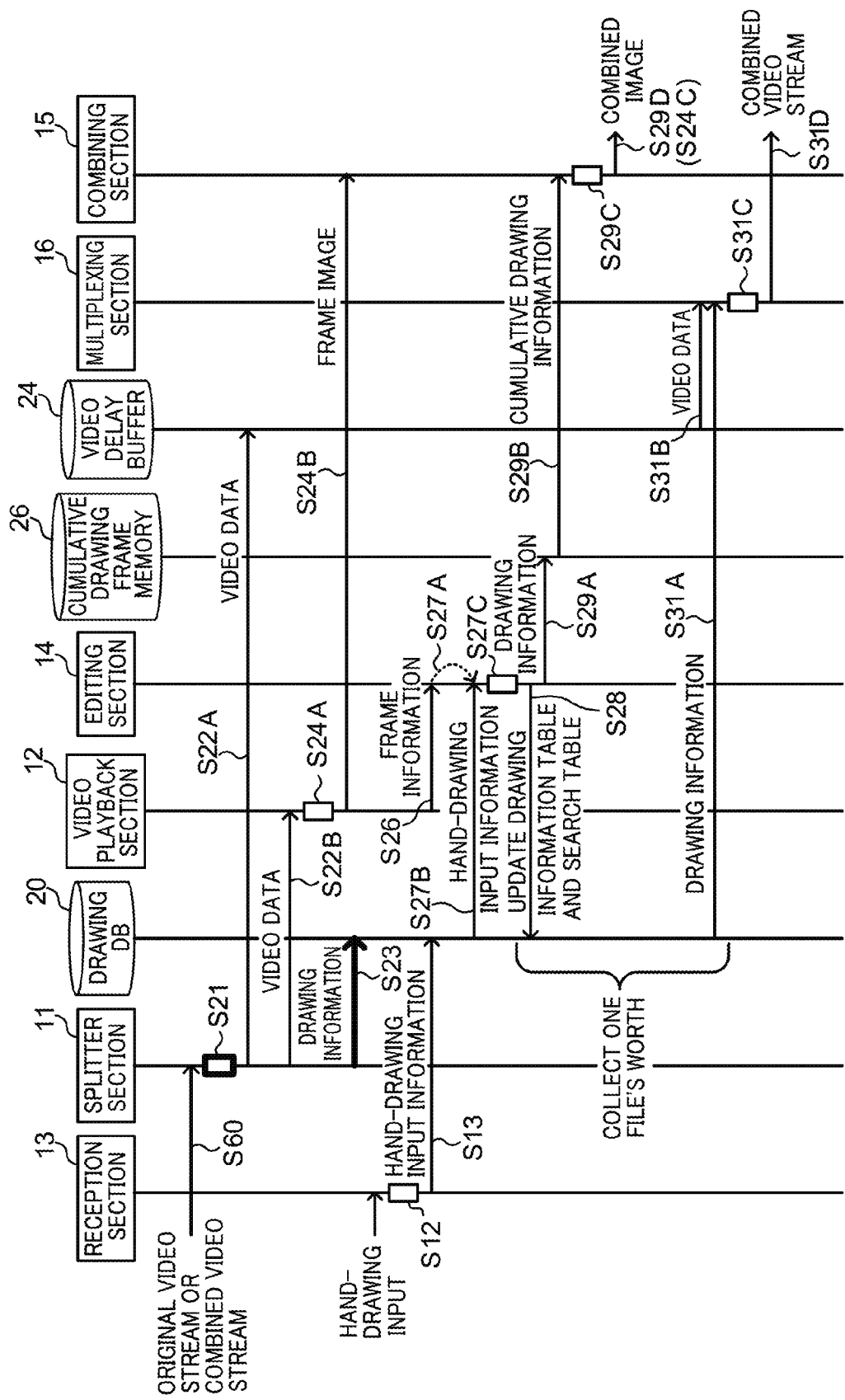
FIG. 20 is a sequence diagram to explain processing of a drawing processing device.

Next, explanation follows regarding operation of the drawing processing device 10, with a particular focus on the exchange of data between the respective sections, with reference to the sequence diagrams illustrated in FIG. 20 and FIG. 21. Note that in the processing illustrated in FIG. 20 and FIG. 21 respectively, processing similar to that of the hand-drawn information collection processing illustrated in FIG. 17, and the drawing processing illustrated in FIG. 18 and FIG. 19, is appended with corresponding step numbers, and detailed explanation thereof is omitted.

First, explanation follows regarding a case in which drawing is performed during playback of an original video stream, with reference to FIG. 20. When an original video stream is input (S60), the video data is stored in the video delay buffer 24 (S22A), and is passed to the video playback section 12 (S22B). The video playback section 12 decodes the video data (S24A), and outputs frame images to the combining section 15 one frame at a time (S24B). The combining section 15 is capable of displaying combined images in which images expressed by the cumulative drawing information are overlaid on the frame images. However, no cumulative drawing information exists at this stage, and so only the frame image is displayed (S24C).

When hand-drawing is performed on the frame images, the reception section 13 receives drawing operation content and position information from the hand-drawing input device 30 at a specific time interval, generates the hand-drawing input information (S12), and stores the hand-drawing input information in the hand-drawn information table 21 of the drawing DB 20 (S13).

The video playback section 12 outputs frame information to the editing section 14 (S26) at the frame image output timing. Using the output of the frame information as a trigger (S27A), the editing section 14 acquires hand-drawing input information from the drawing DB 20 (S27B), and generates drawing information corresponding to the frame number indicated in the frame information (S27C). The generated drawing information is then stored in the drawing information table 22 of the drawing DB 20, and the search table 23 is updated (S28).

The editing section 14 also adds the generated drawing information to the cumulative drawing frame memory 26 to generate the cumulative drawing information (S29A). The combining section 15 acquires the cumulative drawing information from the cumulative drawing frame memory 26 (S29B), and overlays images expressed by the cumulative drawing information on the frame images (S29C) so as to display combined images (S29D).

When one file's worth of video data has been collected in the video delay buffer 24, the multiplexing section 16 acquires one file's worth of drawing information from the drawing information table 22 (S31A), and acquires the one file's worth of video data from the video delay buffer 24 (S31B). The multiplexing section 16 then multiplexes the video data with the drawing information (S31C), and stores the combined video stream (S31D).

Next, explanation follows regarding a case in which a combined video stream is played back, again with reference to FIG. 20. When the combined video stream is input (S60), the splitter section 11 splits the combined video stream (S21), and stores the split-off drawing information in the hand-drawn information table 21 of the drawing DB 20 (S23). This thereby enables drawings expressed by the drawing information recorded in the combined video stream to be processed as if they had only just been input by hand. Namely, with the exception of splitting the combined video stream at step S21, and storing the drawing information in the hand-drawn information table 21 at step S23, processing can be performed similarly to in cases in which drawing is performed during playback of an original video stream, as described above. Moreover, processing can be performed similarly to in cases in which drawing is performed during playback of an original video stream, as described above, even when drawings are added during playback of a combined video stream.

Next, explanation follows regarding the modification mode, with reference to FIG. 21. In FIG. 21, explanation is given regarding a case in which modification is performed to delete a previous hand-drawn drawing, and then add a new drawing.

The editing section 14 acquires hand-drawing input information regarding the deletion performed when paused from the hand-drawn information table 21 (S44), and, using the position information included in the hand-drawing input information, ascertains each of the pixels of the drawing deleted using the eraser tool. The editing section 14 then references the search table 23, and ascertains the frame numbers stored associated with the ascertained pixels (S45). The editing section 14 deletes the drawing information for the ascertained frame numbers from the drawing information table 22 (S46), and returns the ascertained frame numbers to their initial values in the search table 23 (S47). Moreover, the editing section 14 updates the cumulative drawing information based on the deleted drawing information (S48A), the combining section 15 acquires the updated cumulative drawing information (S48B), and overlays a drawing expressed by the cumulative drawing information on the paused frame image (S48C) to display a combined image (S48D).

Then, when the hand-drawing tool 46 is changed from the eraser tool to the pencil tool, and addition of a drawing begins, the simulated frame information is output according to the timer (S49). Using the output of the simulated frame information as a trigger (S50A), the editing section 14 acquires hand-drawing input information from the hand-drawn information table 21 of the drawing DB 20 (S50B), and generates drawing information corresponding to the frame numbers indicated by the frame information (S50C). The generated drawing information is then stored in the drawing information table 22 of the drawing DB 20, and the search table 23 is updated (S51).

The editing section 14 adds the generated drawing information to the cumulative drawing frame memory 26 to generate the cumulative drawing information (S48E). The combining section 15 acquires the cumulative drawing information from the cumulative drawing frame memory 26

(S48F), and overlays a drawing expressed by the cumulative drawing information on the frame image (S48G) to display a combined image (S48H).

As described above, the drawing processing device according to the present exemplary embodiment associates drawing information representing hand-drawn drawings with each frame, and records associated information of the positions (coordinates) where drawing has been performed and frame identifiers in the search table. Then, during modification of the drawing information, the frames corresponding to the position of a modified drawing are ascertained from the search table, and drawing information corresponding to the ascertained frames is updated according to the content of the modification. This thereby enables the drawing information associated with each frame to be edited without the effort of searching for and displaying the frames corresponding to the drawing that is to be modified.

Moreover, during playback of a combined video stream multiplexed with drawing information, the drawing information is split off and stored in the hand-drawn information table. This thereby enables editing of drawing information even for drawing information that has already been recorded as part of a combined video stream.

Note that in the exemplary embodiment described above, as an example, explanation has been given regarding an example that anticipates use by a baseball coach and players. However, the technology disclosed herein is applicable in various fields, for example instruction for sports other than baseball, at places of learning, in presentations, and the like.

In the above explanation, explanation has been given regarding an embodiment in which the drawing processing program 60 is pre-stored (installed) in the storage section 53. However, the drawing processing program 60 may also be provided in a format recorded on a recording medium such as a CD-ROM or a DVD-ROM.

In the related technology in which camera footage data is combined with hand-drawn drawing data as the camera footage data is being input, the hand-drawn drawing data is recorded together with the camera footage data, as a single new video image. Accordingly, in such related technology, it is not possible to edit hand-drawn drawings once they have been recorded. Similar applies in the related technology in which hand-drawn drawing data is combined and displayed on a lecturer computer.

Moreover, in the related technology in which a video stream and a graphic stream such as subtitles are multiplexed, pre-prepared data is overlaid on frames at a predetermined display timing. Accordingly, this related technology is not compatible with drawing by hand. Similarly, in the related technology in which line drawings expressing graphics generated based on vector data are drawn onto images reproduced from image data, it is taken as a given that the timing for drawing the line images, and the line image data, has been found in advance based on the results of image analysis. Accordingly, this related technology is not compatible with drawing by hand.

The technology disclosed herein enables editing of drawing information associated with respective frames.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A drawing processing device comprising:
   a memory; and
   a processor coupled to the memory, the processor configured to:
   receive, for any frame out of a plurality of frames included in a video that have each been associated with drawing information representing drawing performed on the plurality of frames, position information indicating a position within the frame of an edited drawing, and editing content;
   reference the memory storing associated information of the position information of the drawing within the frame and an identifier of the frame on which the drawing was performed, and ascertain identifiers of any frames corresponding to the received position information; and
   edit the drawing information associated with each frame indicated by the ascertained identifiers, based on the received editing content.

2. The drawing processing device of claim 1, wherein, in cases in which the editing content is deletion of a drawing and addition of a drawing, drawing information associated with each frame indicated by the ascertained identifiers is deleted, and drawing information representing an added drawing is associated with each frame from which the drawing information was deleted.

3. The drawing processing device of claim 2, wherein, in cases in which a drawing duration of an added drawing is longer than a total playback duration of all of the frames from which the drawing information has been deleted:
   a plurality of drawing information equivalent to the extra duration is associated with any frame out of the frames from which the drawing information has been deleted; or
   drawing information representing the added drawing is reassigned to each frame from which the drawing information has been deleted.

4. The drawing processing device of claim 1, the processor further configured to store in the memory, by frame unit, the drawing information associating position information and editing content received at a display timing of each frame, with the identifier of that frame.

5. The drawing processing device of claim 4, wherein, as the position information of the drawing information, position information is stored of a start point and an end point of a drawing at a display timing of the frame associated with the drawing information.

6. The drawing processing device of claim 4, wherein, when storing drawing information in the memory, and when editing drawing information that has been stored in the memory, the associated information stored in the memory associated with drawing position information ascertained using the drawing information is updated.

7. The drawing processing device of claim 1, the processor further configured to generate cumulative drawing information in which drawing information associated with each of the plurality of frames is accumulated according to a frame displayed during playback of the video, and synthesize a cumulative drawing expressed by the cumulative drawing information generated for the frame displayed.

8. The drawing processing device of claim 1, the processor further configured to split off the drawing information from the video and store the drawing information in the memory when playing back video associated with the drawing information.

9. The drawing processing device of claim 1, wherein the associated information is information in which identifiers of a plurality of frames are associated with one item of position information.

10. The drawing processing device of claim 9, wherein, in cases in which a plurality of frame identifiers are present corresponding to the received position information, the identifier for the frame closest to the display timing of a frame having a drawing edited during video playback is ascertained.

11. The drawing processing device of claim 1, wherein the drawing information includes identification information for identifying a set of drawings.

12. A drawing processing method comprising:
executed by a processor,
receiving, for any frame out of a plurality of frames included in a video that have each been associated with drawing information representing drawing performed on the plurality of frames, position information indicating a position within the frame of an edited drawing, and editing content;
referencing a memory storing associated information of the position information of the drawing within the frame and an identifier of the frame on which the drawing was performed, and ascertaining identifiers of any frames corresponding to the received position information; and
editing the drawing information associated with each frame indicated by the ascertained identifiers, based on the received editing content.

13. The drawing processing method of claim 12, wherein, in cases in which the editing content is deletion of a drawing and addition of a drawing, drawing information associated with each frame indicated by the ascertained identifiers is deleted, and drawing information representing an added drawing is associated with each frame from which the drawing information was deleted.

14. The drawing processing method of claim 12, further comprising storing in the memory, by frame unit, the drawing information associating position information and editing content received at a display timing of each frame, with the identifier of that frame.

15. The drawing processing method of claim 14, wherein, as the position information of the drawing information, position information is stored of a start point and an end point of a drawing at a display timing of the frame associated with the drawing information.

16. The drawing processing method of claim 14, wherein, when storing drawing information in the memory, and when editing drawing information that has been stored in the memory, the associated information stored in the memory associated with drawing position information ascertained using the drawing information is updated.

17. The drawing processing method of claim 12, further comprising generating cumulative drawing information in which drawing information associated with each of the plurality of frames is accumulated according to a frame displayed during playback of the video, and synthesizing a cumulative drawing expressed by the cumulative drawing information generated for the frame displayed.

18. The drawing processing method of claim 12, further comprising splitting off the drawing information from the video and storing the drawing information in the memory when playing back video associated with the drawing information.

19. A drawing processing method comprising:
referencing drawing information that is stored associated with a video playback timing and expressing a drawing performed on a plurality of frames included in a video, and playing back the drawing information overlaid on the video at the stored playback timing;
during playback of the video overlaid with the drawing information, receiving and storing an editing operation to change a first drawing overlaid on the video that is being played back to a second drawing; and
by a processor, playing back the second drawing overlaid on the video at the same timing as a playback timing of the first drawing on the video.

* * * * *